US008186753B2

(12) United States Patent
Fujisawa et al.

(10) Patent No.: US 8,186,753 B2
(45) Date of Patent: May 29, 2012

(54) SEAT APPARATUS FOR VEHICLE

(75) Inventors: Hideki Fujisawa, Nishio (JP); Hiroyuki Okazaki, Chiryu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 372 days.

(21) Appl. No.: 12/543,745

(22) Filed: Aug. 19, 2009

(65) Prior Publication Data

US 2010/0052370 A1    Mar. 4, 2010

(30) Foreign Application Priority Data

Aug. 29, 2008  (JP) ................................. 2008-222824

(51) Int. Cl.
*A47C 9/06*   (2006.01)
(52) U.S. Cl. .......... 297/15; 297/331; 297/332; 297/334; 297/336
(58) Field of Classification Search ............... 297/15, 297/331–336
See application file for complete search history.

(56) References Cited

U.S. PATENT DOCUMENTS

| 6,375,245 B1* | 4/2002 | Seibold et al. ............. 296/65.03 |
| 6,843,526 B2 | 1/2005 | Honda et al. |
| 6,935,682 B2 | 8/2005 | Park |
| 7,273,254 B2* | 9/2007 | Fujita et al. .................... 297/331 |
| 7,377,582 B2* | 5/2008 | Fukada et al. ................... 297/15 |
| 7,784,860 B2* | 8/2010 | Schacht et al. .................. 297/15 |
| 2001/0052718 A1* | 12/2001 | Sugiura et al. .................. 297/15 |

FOREIGN PATENT DOCUMENTS

| JP | 2005-126035 | 5/2005 |
| JP | 2006-264586 | 10/2006 |

* cited by examiner

*Primary Examiner* — Laurie Cranmer
(74) *Attorney, Agent, or Firm* — Oblon, Spivak, McClelland, Maier & Neustadt, L.L.P.

(57) ABSTRACT

A seat apparatus for a vehicle includes a seat for the vehicle, a seat moving mechanism moving the seat between a seating position and a stowed position, a plurality of engagement members provided at a vehicle floor, a plurality of locking members provided at the seat to face the plurality of engagement members respectively and engaging with the plurality of engagement members to lock the seat at the seating position, and an engagement position adjusting mechanism adjusting a position of at least one of the engagement member and the locking member that face each other in an engaging movement locus direction where the locking member moves to engage with the engagement member.

10 Claims, 25 Drawing Sheets

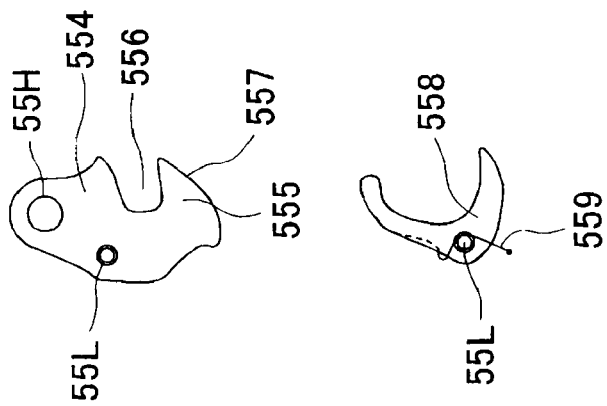
FIG. 7B
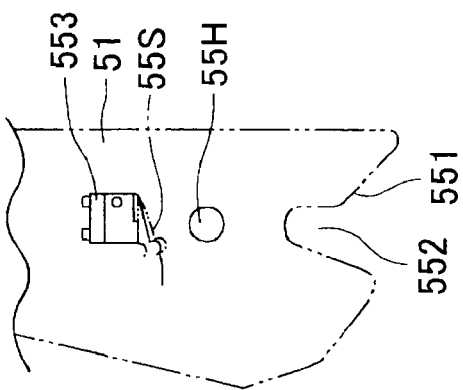
FIG. 7C
FIG. 7D
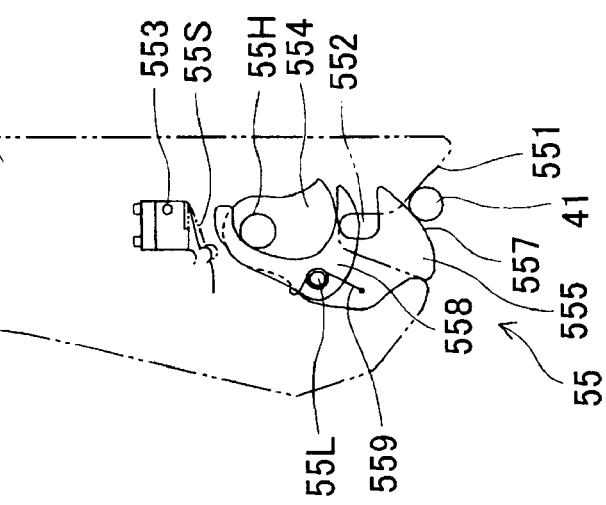
FIG. 7A

F I G. 12
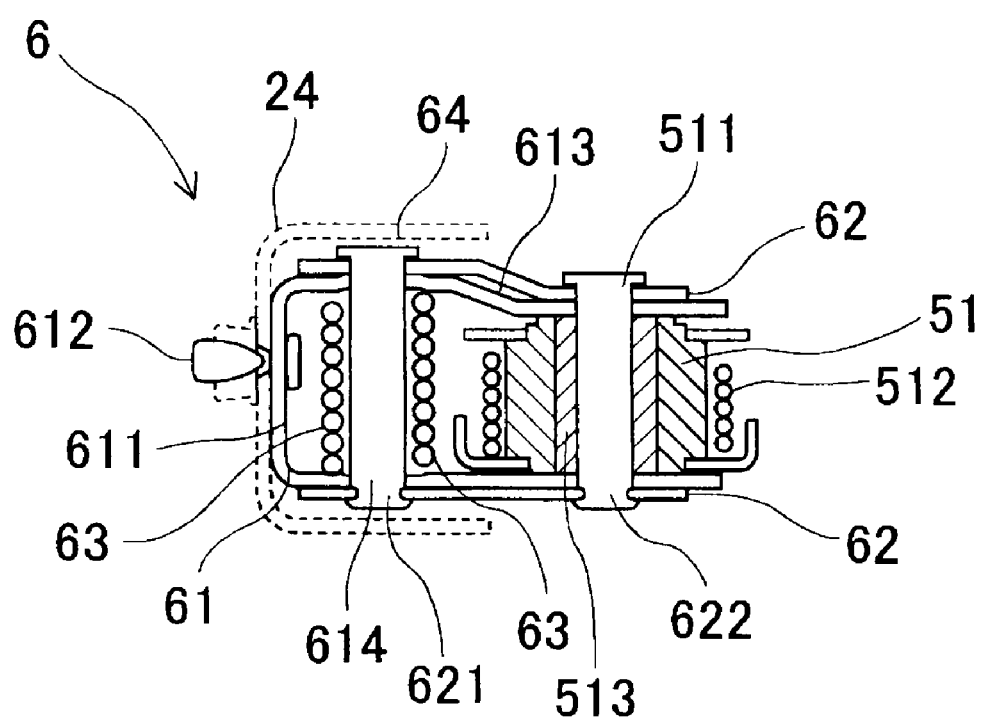

F I G. 27
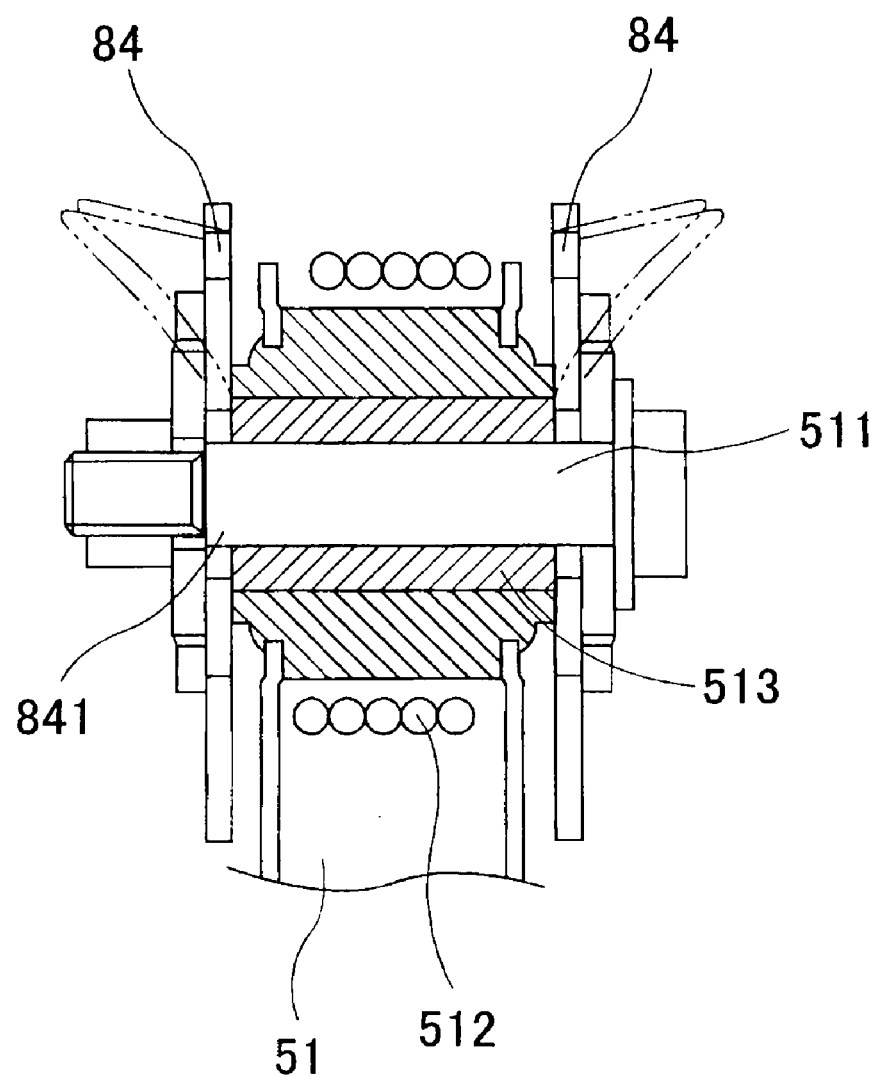

F I G. 29
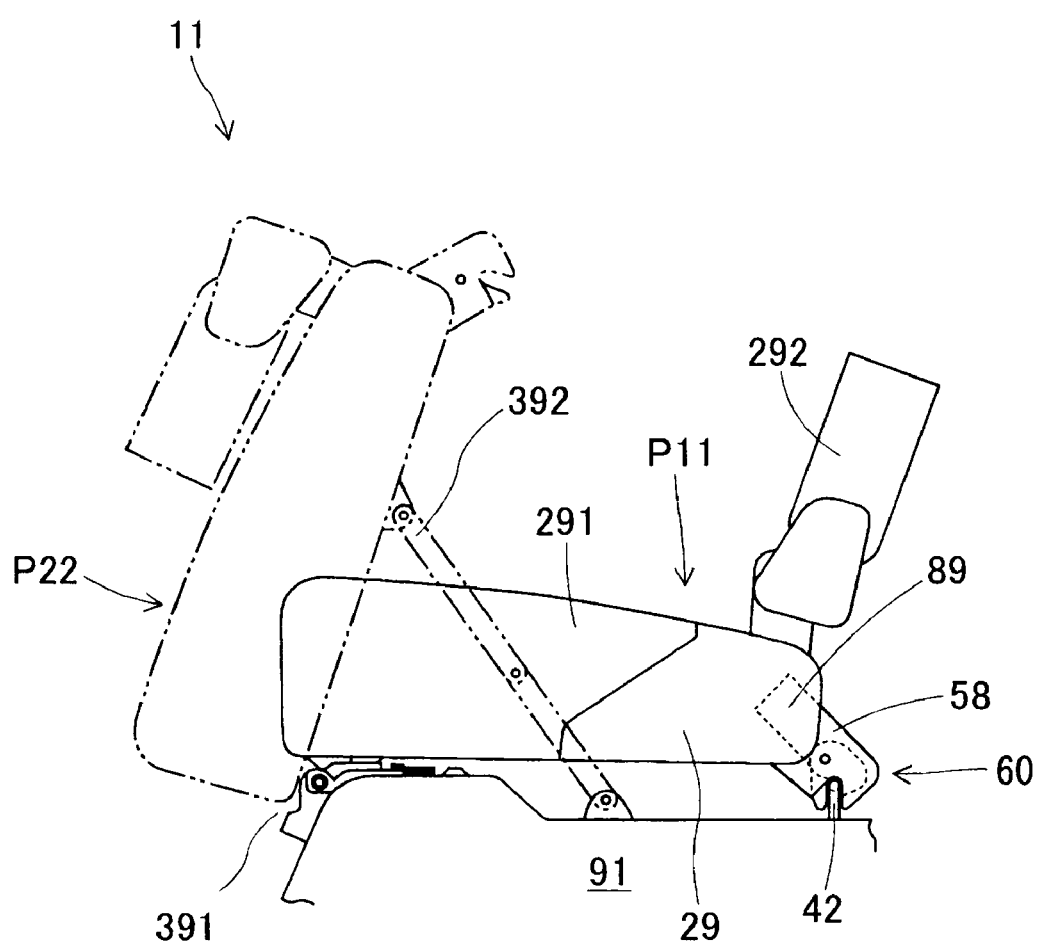

SEAT APPARATUS FOR VEHICLE

CROSS REFERENCE TO RELATED APPLICATIONS

This application is based on and claims priority under 35 U.S.C. §119 to Japanese Patent Application 2008-222824, filed on Aug. 29, 2008, the entire content of which is incorporated herein by reference.

FIELD OF THE INVENTION

The present invention relates to a seat apparatus for a vehicle.

BACKGROUND

A known seat apparatus for a vehicle is movable between a seating position and a stowed position so as to increase a passenger capacity, a space for luggage, and the like. For example, JP2005-126035A (corresponding to U.S. Pat. No. 6,935,682) (hereinafter referred to as Reference 1) discloses a sinking seat for a vehicle that includes catch legs at a lower front portion of a seat cushion and grooved legs at a lower rear portion of the seat cushion. Each of the legs is engageable and disengageable relative to a floor. The seat apparatus is configured to be locked at the seating position by means of the four legs. The seat apparatus is stowed within a concave portion formed at the floor in such a manner that a seatback is folded on the seat cushion by means of lower portions of rear legs rotatable relative to the floor. The rear legs also include upper portions respectively that are integrally connected to the grooved legs. In addition, a vehicle seat disclosed in JP2006-264586A (hereinafter referred to as Reference 2) includes left and right front legs supporting a front portion of a cushion frame and left and right rear legs supporting a rear portion of the cushion frame. Each of the front legs and each of the rear legs are connected to each other by means of a stranded cable. The front legs and the rear legs are rotatable relative to the cushion frame. When the vehicle seat is stowed, each of the legs rotates to be accommodated within a space formed at a floor by means of the stranded cable and other mechanisms, so that the vehicle seat is compactly stowed.

Further, US2003-0184129A1 (hereinafter referred to as Reference 3) discloses a seat for a vehicle including a hinge mechanism provided at one side surface of a seat cushion (seat base) and two legs provided at a lower side of the other side surface of the seat cushion. Specifically, the two legs are arranged at front and rear portions of the lower side of the other side surface. When the seat rotates upward about the hinge mechanism while a seatback is folded on the seat cushion, the seat is stowed sideways. When the seat rotates downward from the stowed position and the legs engage with respective strikers (engagement members), the seat is brought to a seating position.

As mentioned above, according to the mechanism where the seat is locked at the seating position by means of the four legs or of the hinge mechanism and the two legs, lock devices are generally provided at lower ends of the respective legs while the strikers (engagement members) for engagement with the respective lock devices are provided at a vehicle floor.

According to the structure including the four legs disclosed in Reference 1 and Reference 2, while the seat is moving from the stowed position to the seating position, the last fourth lock device may not successfully engage with the striker even when the three lock devices engage with the respective strikers. More specifically, members constituting the lock device and the strikers each may have a manufacturing tolerance. In addition, variations in positional relationship caused when the members are mounted may occur. Thus, operation timings of the four lock devices possibly vary. The lock device that operates first is not influenced by operations of the other three lock devices and thus easily engages with the striker. The following second and third lock devices are able to engage with the respective strikers because the position of the seat is not yet fixed. However, after the first to third lock devices engage with the respective strikers, the seat is locked at three points and thus the position of the seat is restricted. Then, positions of the remaining fourth lock device and the corresponding striker may not match each other, which leads to an incomplete locking of the seat at the seating position. In the same way, according to the structure including the hinge mechanism and the two legs disclosed in Reference 3, the first lock device that is operated first successfully engages with the striker, however, the second lock device may unsuccessfully engage with the striker.

In a case where even only one of the lock devices incompletely engages with the corresponding striker, the stability of the seat in the seating position deteriorates.

The operations of the lock devices may vary from each other because of not only an initial factor such as dimensions and a mounting position of each component but also a time-dependent factor such as abrasion and deformation of the component caused by a frequent use.

A need thus exists for a seat apparatus for a vehicle which is not susceptible to the drawback mentioned above.

SUMMARY OF THE INVENTION

According to an aspect of the present invention, a seat apparatus for a vehicle includes a seat for the vehicle, a seat moving mechanism moving the seat between a seating position and a stowed position, a plurality of engagement members provided at a vehicle floor, a plurality of locking members provided at the seat to face the plurality of engagement members respectively and engaging with the plurality of engagement members to lock the seat at the seating position, and an engagement position adjusting mechanism adjusting a position of at least one of the engagement member and the locking member that face each other in an engaging movement locus direction where the locking member moves to engage with the engagement member.

BRIEF DESCRIPTION OF THE DRAWINGS

The foregoing and additional features and characteristics of the present invention will become more apparent from the following detailed description considered with the reference to the accompanying drawings, wherein:

FIGS. 7A to 7D are diagrams each explaining a front lock device in detail according to the first embodiment;

FIG. 12 is a cross-sectional view taken along line XII-XII shown in FIG. 11;

FIG. 13A illustrates a state where the front leg is arranged at a lowest position, FIG. 13B illustrates a state where the front leg is arranged at an intermediate position serving as a base position, and FIG. 13C illustrates a state where the front leg is arranged at a highest position according to the first embodiment;

FIG. 27 is a diagram illustrating an arrangement of the front leg on which a height adjustment is not conducted according to the third embodiment;

FIG. 29 is a side view illustrating a seat apparatus for a vehicle including a hinge mechanism according to a fourth embodiment.

DETAILED DESCRIPTION

Figure 1:
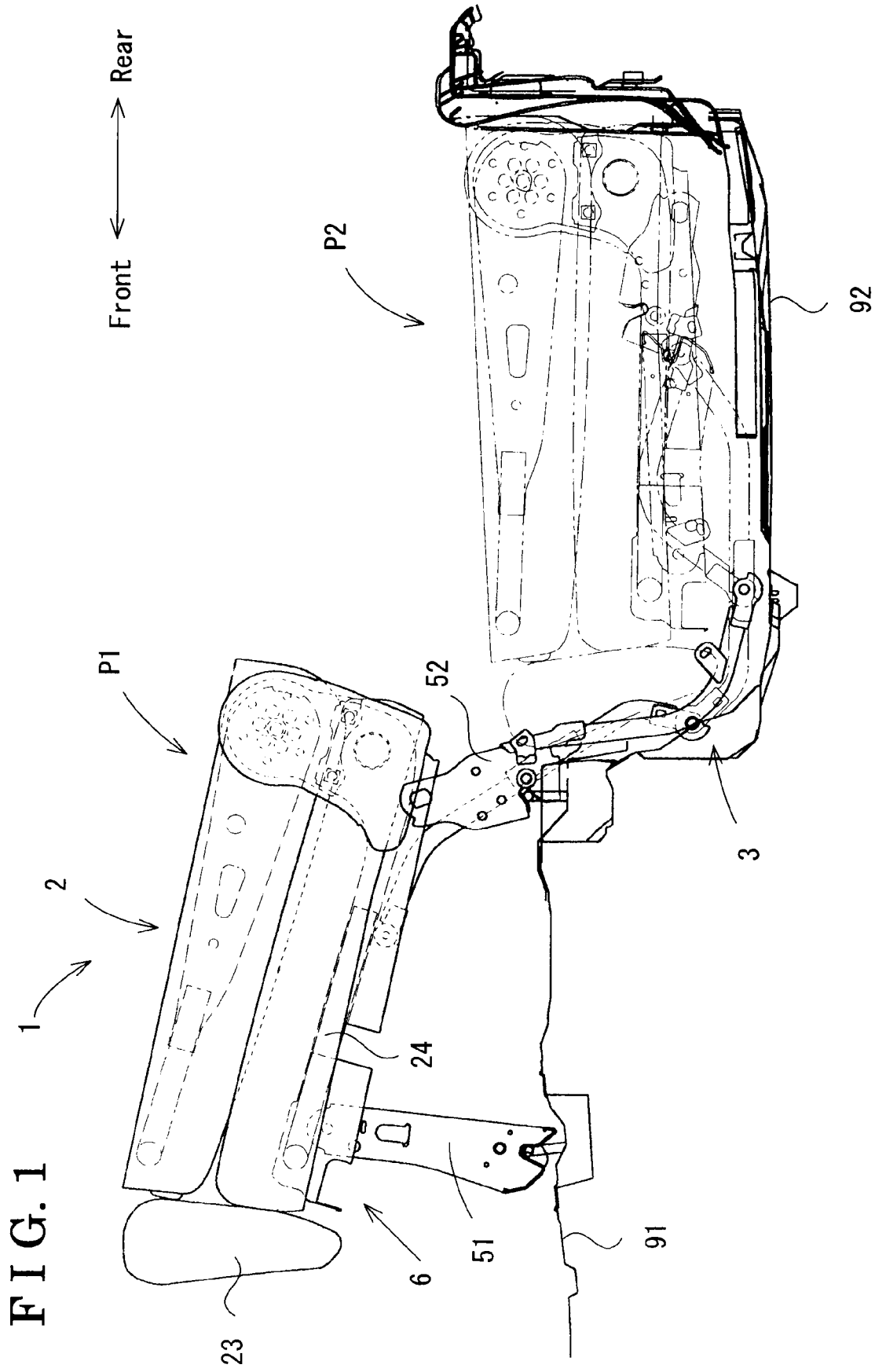
FIG. 1 is a side view illustrating an entire structure of a seat apparatus for a vehicle according to a first embodiment.
Figure 2:
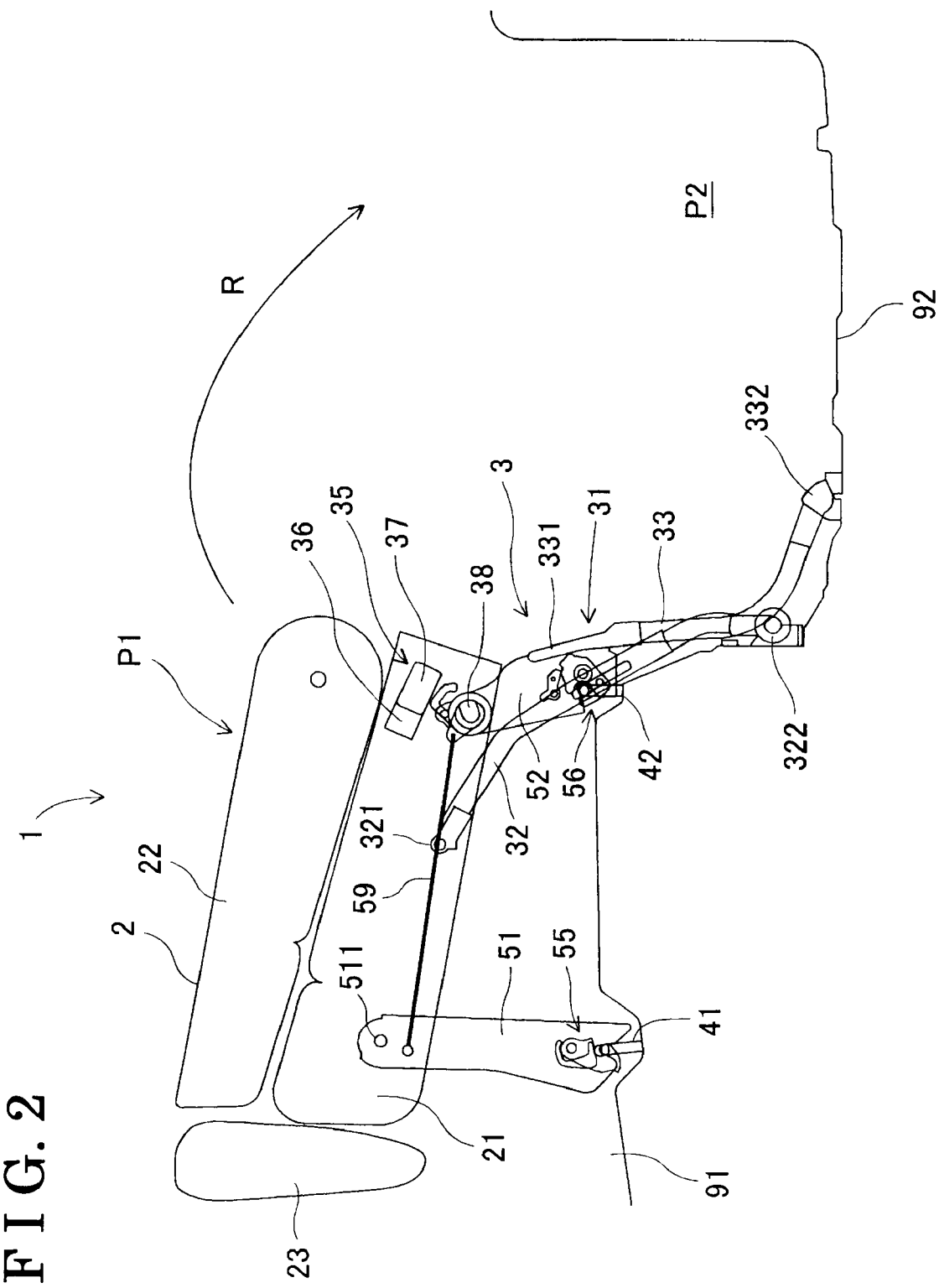
FIG. 2 is a side view illustrating a state where a seat for a vehicle is locked at a seating position according to the first embodiment.
Figure 3:
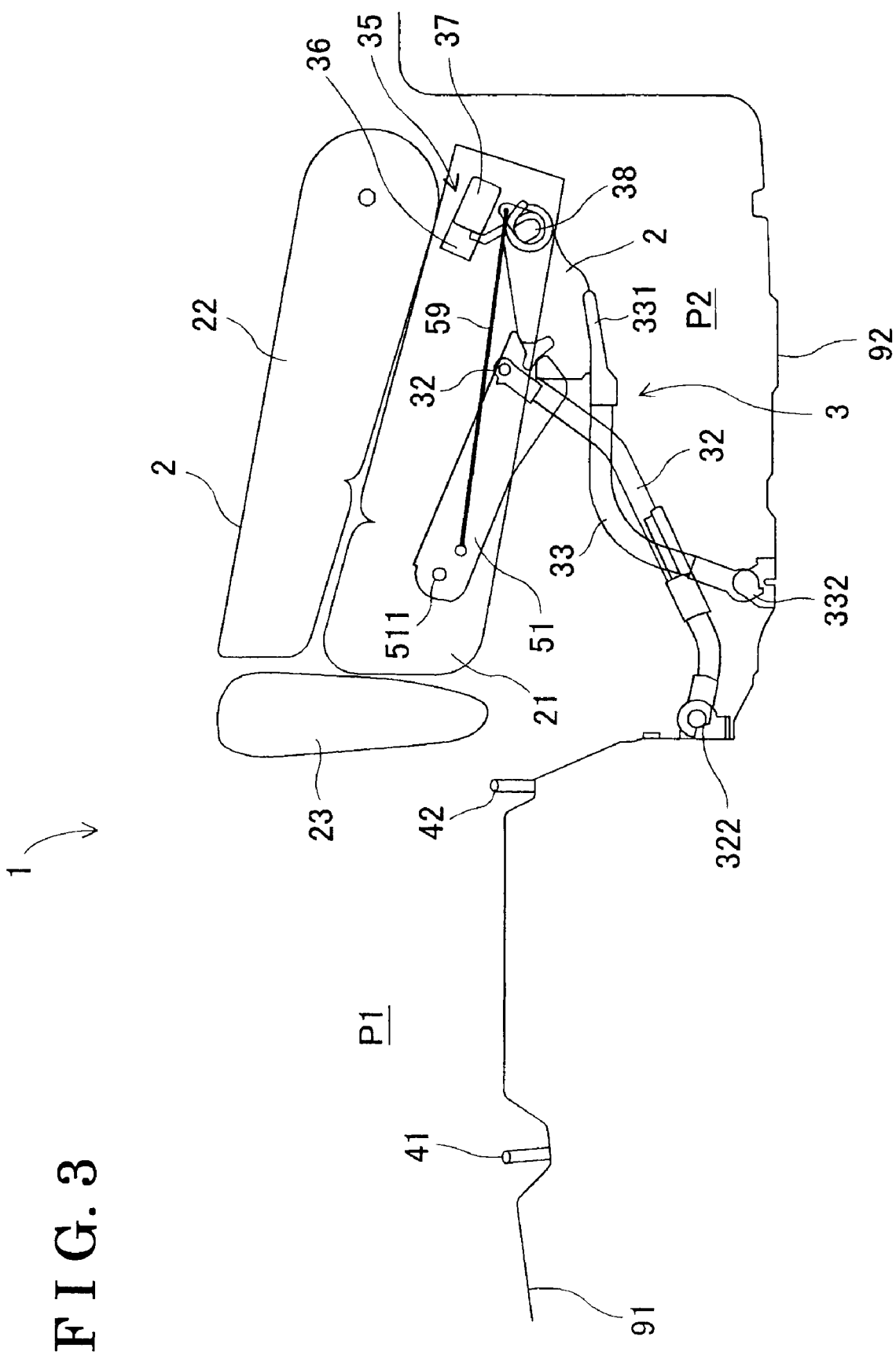
FIG. 3 is a side view illustrating a state where the seat is in process of moving from the seating position to a stowed position according to the first embodiment.
Figure 4:
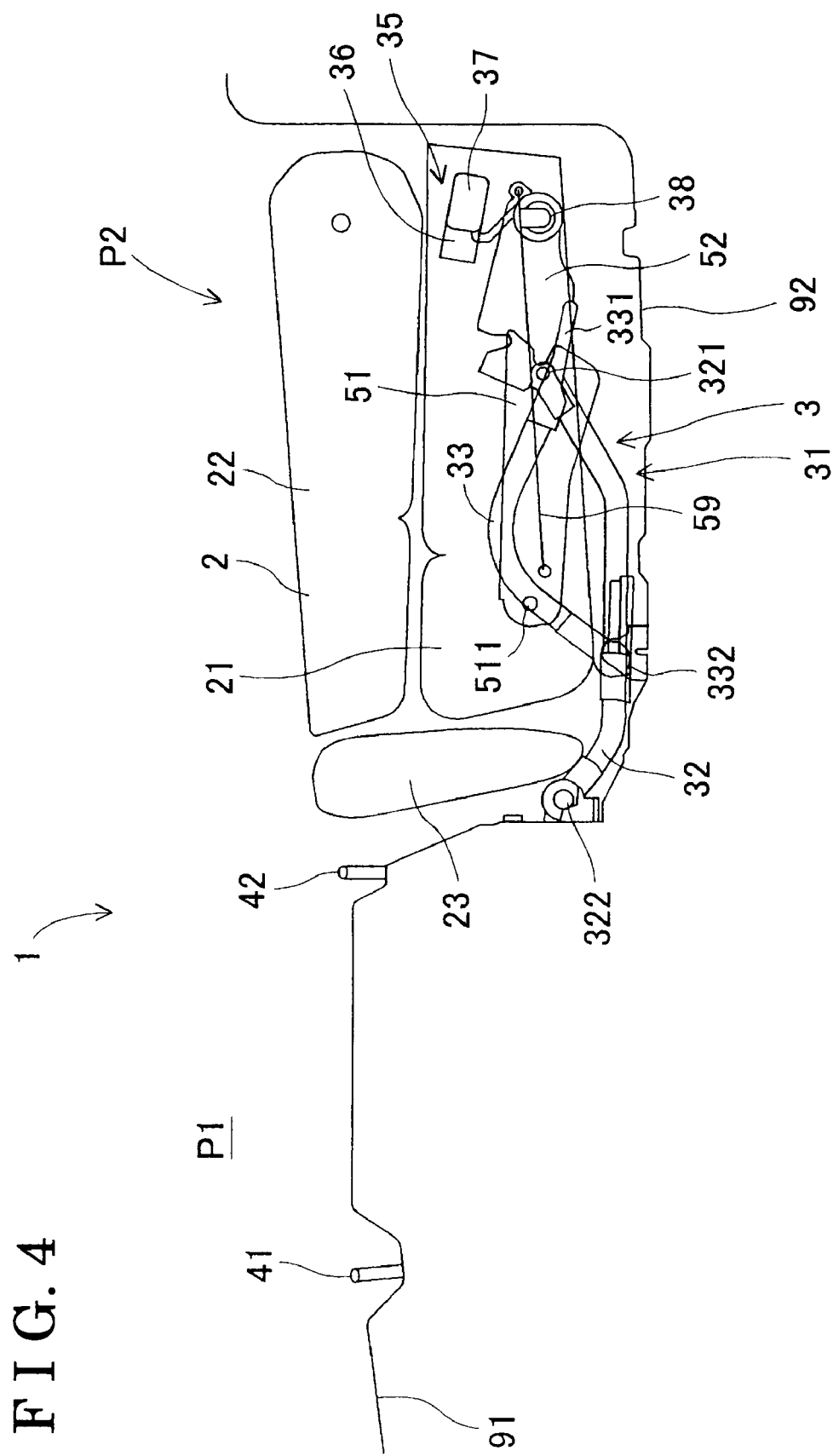
FIG. 4 is a side view illustrating a state where the seat is stowed at the stowed position according to the first embodiment.

A first embodiment will be explained with reference to FIGS. 1 to 20. FIG. 1 is a side view explaining an entire structure of a seat apparatus for a vehicle (hereinafter simply referred to as a seat apparatus) 1 according to the first embodiment. The seat apparatus 1 is mounted on a vehicle floor 91 so as to be movable between a seating position P1 (illustrated by a solid line in FIG. 1) where the seat apparatus 1 is positioned on the vehicle floor 91 and a stowed position P2 (illustrated by a dotted line in FIG. 1) where the seat apparatus 1 is arranged within a seat stowing space 92 formed at the vehicle floor 91 in a recessed manner. The stowed position P2 is arranged in the rear of the seating position P1 in a vehicle longitudinal direction. FIG. 2 is a side view illustrating a state where a seat for a vehicle (hereinafter simply referred to as a seat) 2 is locked at the seating position P1. FIG. 3 is a side view illustrating a state where the seat 2 is in process of moving from the seating position P1 to the stowed position P2. FIG. 4 is a side view illustrating a state where the seat 2 is stowed at the stowed position P2. The seat apparatus 1 includes the seat 2, a four-link mechanism 3, front strikers 41, rear strikers 42, front legs 51, rear legs 52, front lock devices 55, rear lock devices 56, and a leg height adjusting mechanism 6 (see FIG. 11). In FIGS. 1 through 4, the front striker 41, the rear striker 42, the front leg 51, the rear leg 52, and the like provided at one side (specifically, a left side) of the seat 2 in a width direction of the vehicle are illustrated. In addition, directions such as right, left, upper, and lower correspond to those of the vehicle.

The seat 2 includes a seat cushion 21 on which a passenger is seated, a seatback 22 on which the passenger leans, and a headrest 23 on which the passenger rests his/her head. The seat cushion 21 is held above a cushion frame 24. The seatback 22 is provided at a rear end of the seat cushion 21 so as to be tiltable thereto. The seatback 22 is rotatable between a state where the seatback 22 is folded on the seat cushion 21, i.e., fully reclined towards the seat cushion 21, to overlap the seat cushion 21 and a state where the seatback 22 is raised so that the passenger can be seated. The headrest 23 is provided at a top of the seatback 22 so as to be rotatable. When the seat 2 moves between the seating position P1 and the stowed position P2, the seatback 22 is folded on the seat cushion 21 and the headrest 23 tilts towards the seat cushion 21 as illustrated in FIG. 2. Operations of the seatback 22 and the headrest 23 may be automatically performed by means of a drive motor or manually performed by the passenger.

The front strikers 41 and the rear strikers 42 each serve as an engagement member according to the present embodiment. The front strikers 41 and the rear strikers 42 are provided on the vehicle floor 91. Specifically, the two front strikers 41 and the two rear strikers 42 are provided at four portions of the vehicle floor, respectively, facing four corner portions, i.e., front-left, front-right, rear-left, and rear-right corner portions, of the cushion frame 24 of the seat 2 in the seating position P1. Each of the strikers 41 and 42 includes an engaged portion positioned away from the vehicle floor 91 and in parallel thereto and fixed portions bent from both ends of the engaged portion towards the vehicle floor 91 to be fixed thereto.

Figure 5:
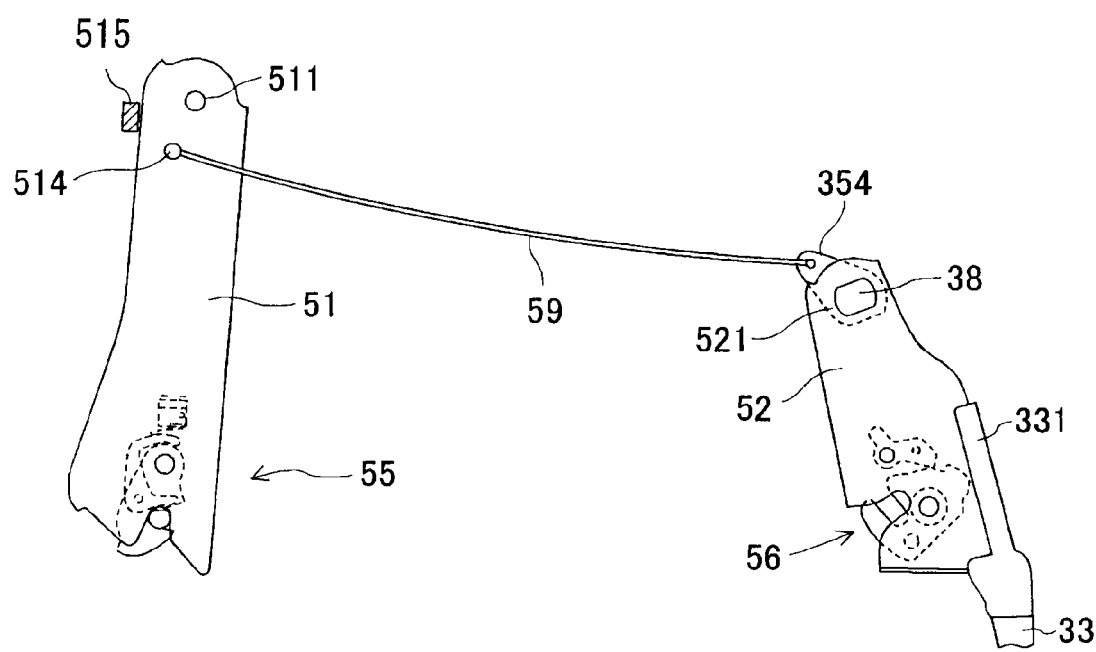
FIG. 5 is an enlarged side view illustrating a front leg and a rear leg according to the first embodiment.
Figure 6:
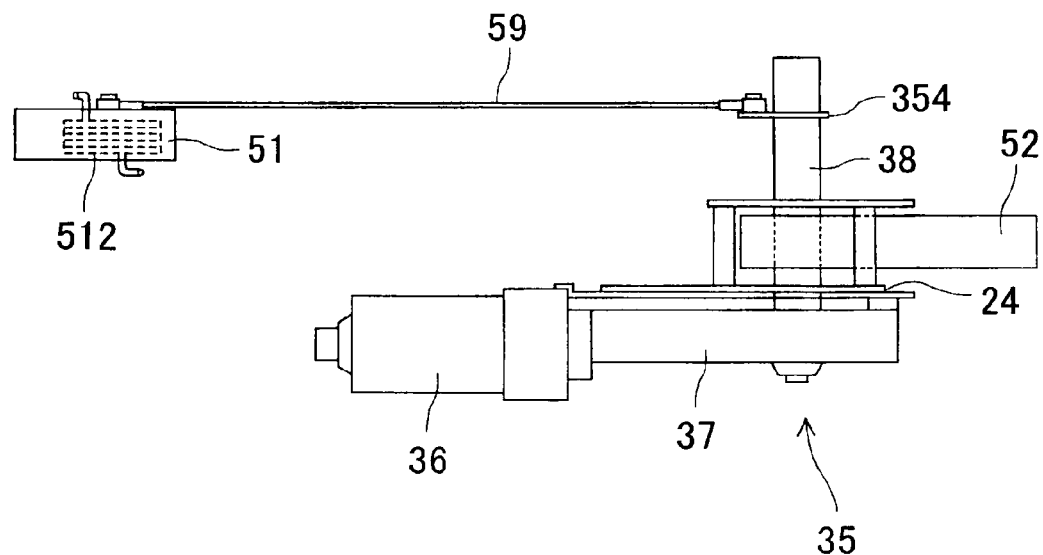
FIG. 6 is an enlarged plan view illustrating a mechanism drive portion of a four-link mechanism in addition to the front leg and the rear leg according to the first embodiment.

The front legs 51, the rear legs 52, the front lock devices 55, and the rear lock devices 56 each serve as a locking member. The two front legs 51 are rotatably arranged at the respective front corner portions, specifically, the front-left and front-right corner portions, of the cushion frame 24 so as to face the respective front strikers 41. In the same way, the two rear legs 52 are rotatably arranged at the respective rear corner portions, specifically, the rear-left and rear-right corner portions, of the cushion frame 24 so as to face the respective rear strikers 42. FIG. 5 is an enlarged side view illustrating the front leg 51 and the rear leg 52 provided at the left side of the vehicle in the width direction. FIG. 6 is an enlarged plan view illustrating a mechanism drive portion 35 of the four-link mechanism 3 in addition to the front leg 51 and the rear leg 52.

In the following, components provided at one side, specifically, the left side of the seat 2 in the width direction of the vehicle will be explained. In a case where a function, a position, and the like are different between components assigned by the same reference numeral provided at both sides of the seat 2 in the width direction thereof, such difference will be additionally explained. As illustrated in FIG. 5, the front leg 51 is formed by a substantially bar-shaped member. The front lock device 55 is provided at a lower end of the front leg 51. A rotational shaft 511 is arranged at an upper end of the front leg 51 so as to extend horizontally in the width direction of the vehicle and is supported via a bearing member 513 (see FIG. 12) so as to be rotatable. One of the rotational shafts 511 provided at one of the front legs 51 is mounted on the cushion frame 24 so as to be rotatable. The other one of the rotational shafts 511 provided at the other one of the front legs 51 is mounted on the cushion frame 24 via the leg height adjusting mechanism 6 (which will be explained later) so as to be rotatable and movable in a substantially vertical direction of the vehicle.

As illustrated in FIG. 6, a coil-shaped leg rotation spring 512 is disposed around the rotational shaft 511 of the front leg 51 so as to bias the front leg 51 in a clockwise direction in FIG. 5. A stopper 515 is provided at the cushion frame 24 so as to restrict a rotational range of the front leg 51. The front leg 51 rotates in the clockwise direction in FIG. 5 by a biasing force of the leg rotation spring 512 until the leg 51 makes contact with the stopper 515. As a result, the front leg 51 is brought in a seating state where the front leg 51 is substantially vertically arranged relative to the cushion frame 24. A first end of a stranded cable 59 is connected to a releasing point 514 provided at a lower side of the rotational shaft 511 of the front leg 51 while a second end of the stranded cable 59 is connected to a bracket 354 (which will be explained later). When the front leg 51 is pulled rearward in the vehicle longitudinal direction (i.e., a rightward side in FIG. 5) by means of the stranded cable 59, the front leg 51 is brought in a stowed state where the leg 51 is arranged in parallel to a lower surface of the cushion frame 24. That is, the leg rotation spring 512, the stranded cable 59, and the like constitute a leg rotation mechanism.

The front lock device 55 engages with or disengages from the front striker 41 provided at the vehicle floor 91. FIGS. 7A through 7D each explain detailed structures of the front lock device 55. Specifically, FIG. 7A is an assembling diagram of the front lock device 55 in which the front leg 51 is shown by a chain double-dashed line. FIG. 7B illustrates a lower end portion of the front leg 51. FIG. 7C illustrates a hook 554. FIG. 7D illustrates a lever 558. The front lock device 55 includes an engagement groove 552 formed at the lower end of the front leg 51, a switch 553, the hook 554, and the lever 558. As illustrated in FIGS. 7A and 7B, the engagement groove 552 that includes a sliding surface 551 on the right in FIGS. 7A and 7B is formed in such a manner that the lower end of the front leg 51 opens gradually wider in a lower direction. A hook support shaft 55H is provided in a projecting manner at an upper side of the engagement groove 552. Further, the switch 553 including an operation contact 55S at a lower side is provided at an upper side of the hook support shaft 55H.

As illustrated in FIG. 7C, the hook 554 is formed by a vertically elongated member. An upper end of the hook 554 is supported by the hook support shaft 55H of the front leg 51 so that the hook 554 is rotatable. The hook 554 includes a hook portion 555 and an engagement groove 556. Specifically, a portion from a substantially middle in a height direction to a lower end of the hook 554 forms the hook portion 555 bending rearward in the vehicle longitudinal direction (i.e., right side in FIG. 7C). The engagement groove 556 is formed at an upper side of the hook portion 555 to open rearward. The engagement groove 556 is engageable with the front striker 41 by intersecting with the engagement groove 552 formed at the lower end of the front leg 51. A lower end of the hook portion 555 forms a sliding surface 557 of which rear side (right side in FIG. 7C) inclines greatly. A lever support shaft 55L is formed in a projecting manner at an intermediate portion in a height direction and at a front side (left side in FIG. 7C) of the hook 554. The hook 554 is constantly biased in a counterclockwise direction by a spring so as to close the engagement groove 552 of the front leg 51 as illustrated in FIG. 7A. The hook 554 rotates in a clockwise direction against a biasing force of the spring to open the engagement groove 552 by means of a front open device.

The front open device includes, for example, a solenoid provided at a lower surface of the cushion frame 24 and a release wire that extends horizontally from the solenoid. The release wire that extends from the solenoid is anchored, via the rotational shaft 511, at the intermediate portion in the height direction of the hook 554 and at a left end portion in FIG. 7C of the hook 554. When the solenoid is biased, the hook 554 is pulled by the release wire so as to rotate in the clockwise direction from a state illustrated in FIG. 7A. When the solenoid is prevented from being biased, the hook 554 is biased by the spring so as to rotate in the counterclockwise direction, thereby returning to the state illustrated in FIG. 7A.

As illustrated in FIG. 7D, the lever 558 is bent to be formed into a substantially U-shape. A center of the lever 558 is supported by the lever support shaft 55L of the hook 554 so that the lever 558 is rotatable. A center portion of a torsion spring 559 is fitted to the lever support shaft 55L. A lower end of the torsion spring 559 engages with the hook 554 while an upper end of the torsion spring 559 engages with the lever 558. The lever 558 is constantly biased in the clockwise direction relative to the hook 554 by the torsion spring 559. The lever 558 is arranged in such a manner that when the lever 558 rotates in the counterclockwise direction against a biasing force of the torsion spring 559, the upper end of the lever 558 presses the operation contact 55S of the switch 553 so that the switch 553 is turned on.

Engagement and release operations of the front lock device 55 will be explained hereinafter. FIG. 7A illustrates a state where the front leg 51 moves downward and makes contact with the front striker 41. The front striker 41 is in contact with the sliding surface 551 formed at the right side of the engagement groove 552 of the front leg 51 and the sliding surface 557 of the hook 554. In such state, when the front leg 51 further moves downward, the engagement operation is started. A vertical direction in which the front lock device 55 performs the engagement operation serves as an engaging movement locus direction according to the present embodiment.

Figure 8:
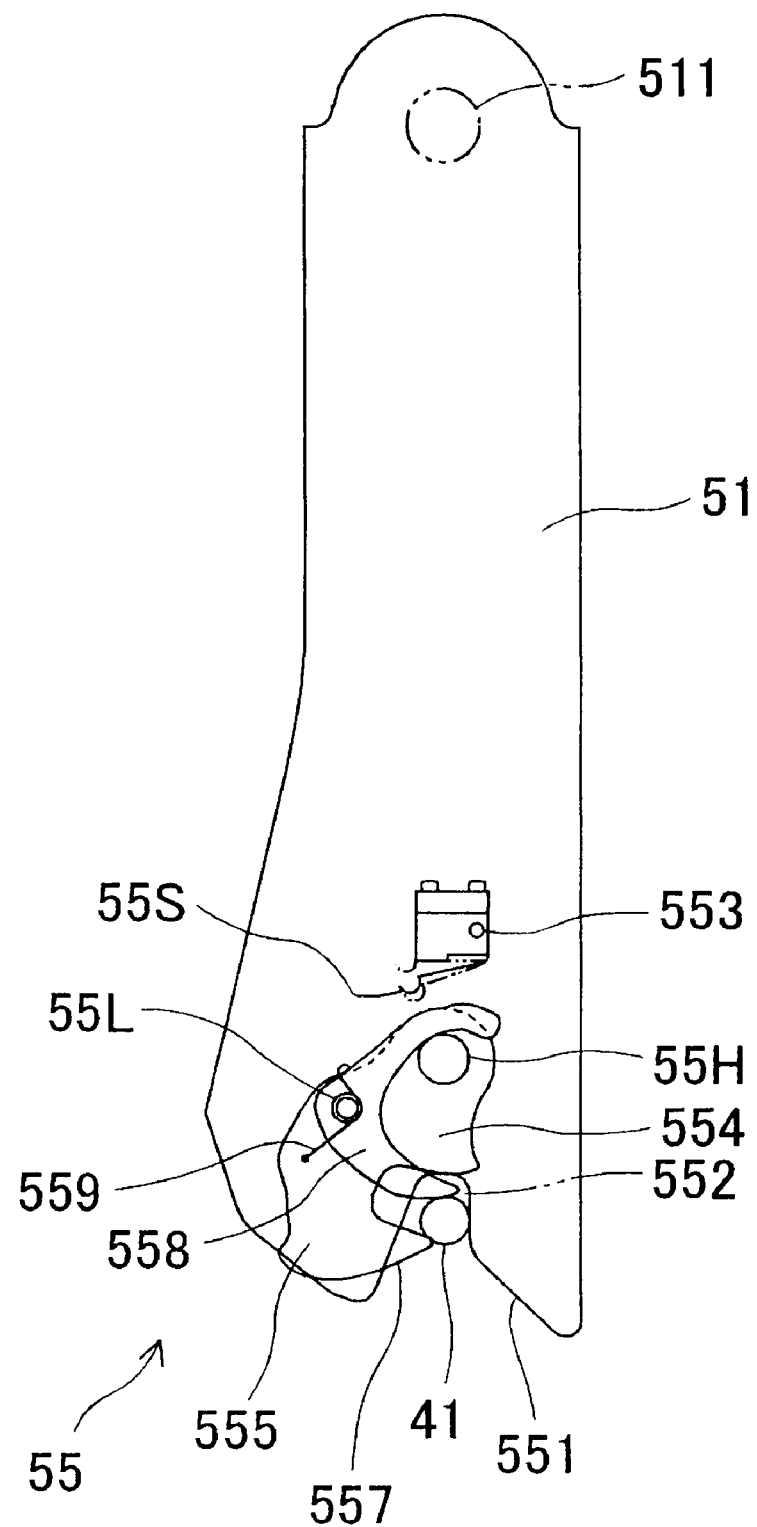
FIG. 8 is a diagram explaining a mid point of an engagement operation of the front lock device as shown in FIGS. 7A to 7D.
Figure 9:
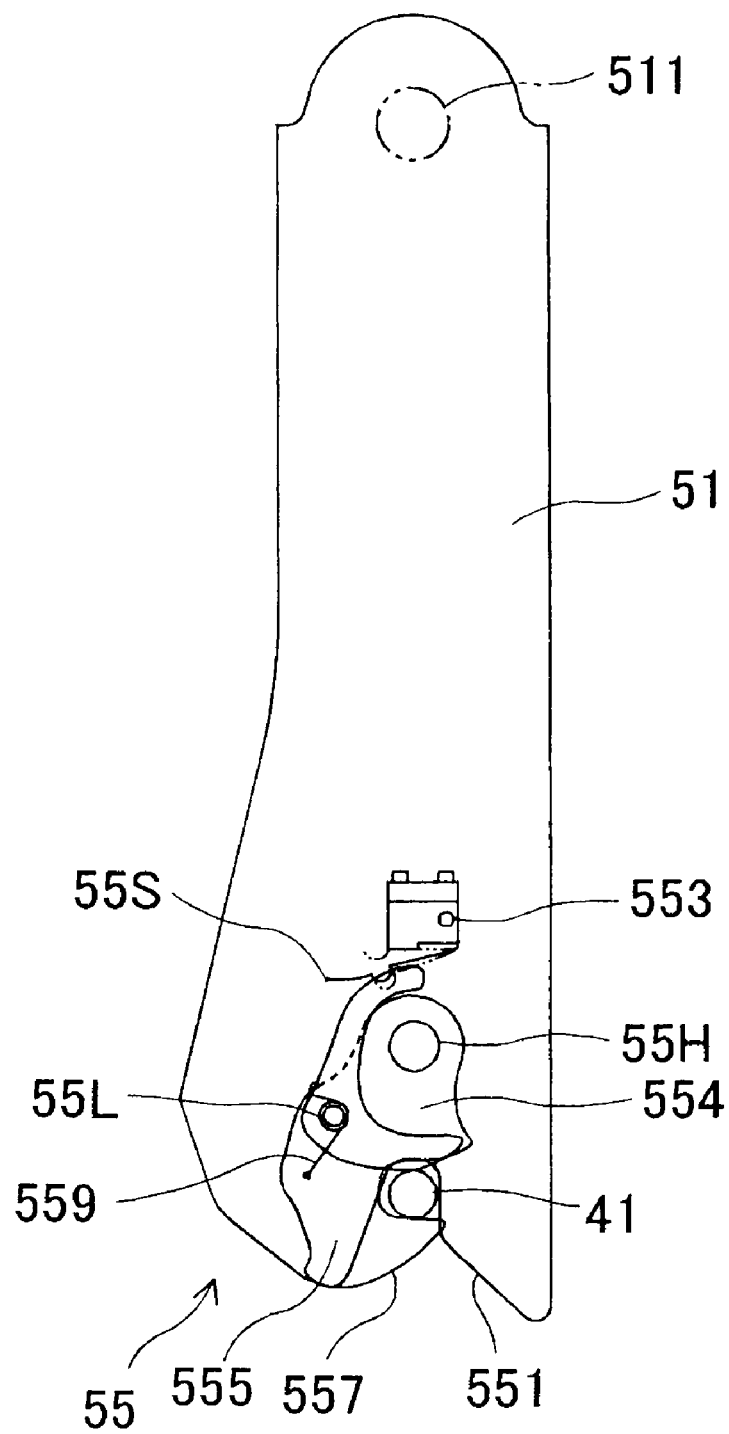
FIG. 9 is a diagram explaining an engagement state of the front lock device as shown in FIGS. 7A to 7D.

When the front leg 51 moves downward, the front striker 41 moves upward relative to the front leg 51 within the engagement groove 552 to cause the hook 554 to rotate in the clockwise direction by sliding on the two sliding surfaces 551 and 557 as illustrated in FIG. 8. FIG. 8 is a diagram explaining a mid point of the engagement operation. When the front striker 41 reaches a height of the engagement groove 552 of the hook 554, the hook 554 rotates in the counterclockwise direction so that the engagement groove 552 engages with the front striker 41 as illustrated in FIG. 9. FIG. 9 is a diagram explaining an engagement state of the front lock device 55. In the engagement state illustrated in FIG. 9, the front leg 51 is locked at the vehicle floor 91 and therefore the relative movement of the front leg 51 in the vertical direction is restricted. The front striker 41 that is inserted to engage with the engagement groove 552 of the hook 554 presses the lower end of the lever 558 upwardly, thereby rotating the lever 558 in the counterclockwise direction against the biasing force of the torsion spring 559. Thus, the upper end of the lever 558 pushes the operation contact 55S of the switch 553 so that the switch 553 is turned on. Consequently, the switch 53 detects that the engagement operation of the front lock device 55 is completed.

On the other hand, in a case where a command is output so as to move the seat 2 to the stowed position P2 in the engagement state illustrated in FIG. 9, the solenoid of the front open device is biased to thereby rotate the hook 554 in the clockwise direction. The engagement groove 552 is opened accordingly. Then, when the front leg 51 moves upward, the front striker 41 relatively moves downward within the engagement groove 552 and moves out thereof, thereby releasing the engagement between the front leg 51 and the front striker 41. The biasing of the solenoid is eliminated after the front leg 51 disengages from the front striker 41, and then the front leg 51 returns to a state where the next engagement operation can be conducted.

As illustrated in FIG. 5, each of the rear legs 52 is formed by a substantially bar-shaped member. The rear lock device 56 is provided at a lower end of the rear leg 52. A two-chamfered hole 521 is formed at an upper portion of each of the rear legs 52. The two-chamfered hole 521 engages with a shaft 38 (which will be explained later) arranged to horizontally extend in the width direction of the vehicle so that the rear legs 52 provided at both sides of the seat 2 in the width direction rotate synchronously. The rear leg 52 rotates in the counterclockwise direction in FIG. 5 about the shaft 38 to be brought in a seating state as illustrated in FIG. 5 where the rear leg 52 is substantially vertically positioned relative to the cushion frame 24. In addition, the rear leg 52 rotates in the clockwise direction in FIG. 5 about the shaft 38 to be brought in a stowed state where the rear leg 52 is positioned in parallel to the lower surface of the cushion frame 24. That is, the shaft 38, and the like constitute a leg rotation mechanism.

Figure 10:
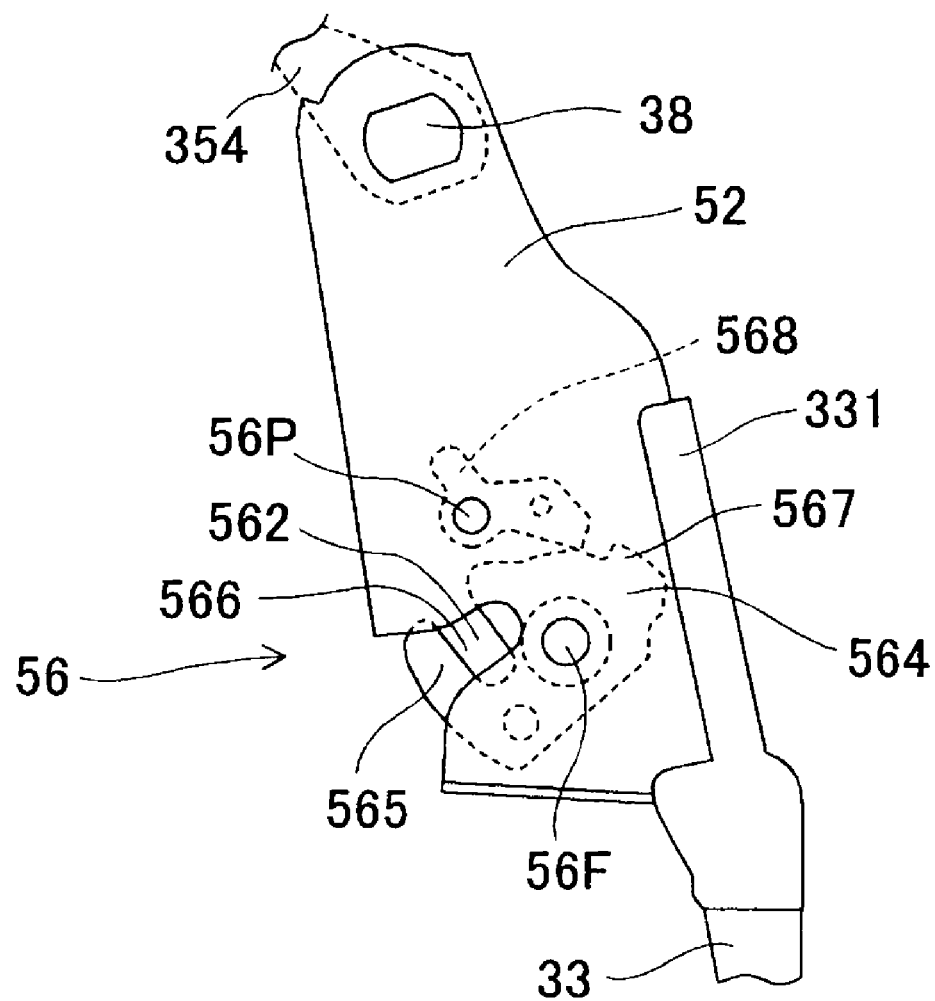
FIG. 10 is a diagram explaining a rear lock device in detail according to the first embodiment.

The rear lock device 56 engages with or disengages from the rear striker 42 provided at the vehicle floor 91. FIG. 10 is a diagram explaining the rear lock device 56 in detail. The rear lock device 56 includes an engagement groove 562 formed at a lower end of the rear leg 52, a hook 564, a pawl 568, and a rear open device. As illustrated in FIG. 10, the engagement groove 562 is formed in such a way that a front lower end (i.e., a lower left side in FIG. 10) of the rear leg 52 opens gradually wider in a front lower direction. A hook support shaft 56F is formed at a rear side (i.e., right side in FIG. 10) of the engagement groove 562 in a projecting manner. Further, a pawl support shaft 56P is formed at an upper side of the engagement groove 562.

The hook 564 is arranged in an inclined manner as illustrated in FIG. 10. A center portion of the hook 564 is supported by the hook support shaft 56F of the rear leg 52 so that the hook 564 is rotatable. The hook 564 includes a hook portion 565, an engagement groove 566, and an engagement projection 567. Specifically, a substantially middle portion in a height direction to a lower end of the hook 564 forms the hook portion 565 that is bending forward in the vehicle longitudinal direction (i.e., left side in FIG. 10). The engagement groove 566 is formed at an upper side of the hook portion 565 so as to open forward (i.e., left side in FIG. 10). The engagement projection 576 is formed at an upper end of the hook 564. The hook 564 is constantly biased in the clockwise direction to close the engagement groove 562 of the rear leg 52. In addition, the hook 564 rotates in the counterclockwise direction by means of the rear open device so as to open the engagement groove 562.

As illustrated in FIG. 10, the pawl 568 is supported by the pawl support shaft 56P formed at the rear leg 52 in a projecting manner so as to be rotatable. The pawl 568 is constantly biased in the clockwise direction by a biasing spring. The pawl 568 is also rotatable in the counterclockwise direction by the rear open device. The pawl 568 rotates in the clockwise direction to thereby engage with the engagement projection 567 of the hook 564 that engages with the rear striker 42. A release operation of the hook 564 is restricted accordingly. In addition, at a time of the release operation, the pawl 568 rotates prior to the hook 564 so as to allow the release operation of the hook 564.

The rear open device includes, for example, a solenoid, an open plate, and a release wire. The solenoid is provided at the lower surface of the cushion frame 24. The open plate is supported at the hook support shaft 56F so as to be rotatable in parallel to the hook 564 and is constantly biased in the clockwise direction by the biasing spring. The release wire extends horizontally from the solenoid and engages with the open plate by winding around the shaft 38. When the solenoid is biased, the open plate is pulled by the release wire so as to rotate in the counterclockwise direction. Then, a cam formed at the open plate engages with a pin formed to project at the pawl 568 to thereby rotate the hook 564 in the counterclockwise direction from a state illustrated in FIG. 10. As a result, the pawl 568 is separated from the engagement projection 567 of the hook 564. Next, a pin formed to project at the open plate makes contact with an elongated bore formed at the hook 564, thereby rotating the hook 564 in the counterclockwise direction to open the engagement groove 562. In a state where the solenoid is prevented from being biased, the open plate is biased by the biasing spring so as to rotate in the clockwise direction. Then, the pin formed at the open plate is separated from an end portion of the elongated bore of the hook 564 and the hook 564 rotate in the clockwise direction by the biasing spring. The cam formed at the open plate disengages from the pin of the pawl 568, so that the pawl 568 rotates in the clockwise direction by the biasing spring. The pawl 568 returns to the state illustrated in FIG. 10.

Engagement and release operations of the rear lock device 56 will be explained below. Prior to the engagement operation, the pawl 568 rotates in the counterclockwise direction by the biasing of the solenoid of the rear open device and then the hook 564 rotates in the counterclockwise direction so that the engagement groove 562 is opened. In such state, when the rear leg 52 moves in a lower front direction from an upper rear direction, the rear lock device 56 approaches the rear striker 42 to thereby start the engagement operation. When the rear leg 52 further moves forward and downward, the rear striker 42 relatively moves rearward and upward to engage with the engagement groove 562 of the rear leg 52. Then, when the rear striker 42 moves all the way through the engagement grove 562 and arrives at a deepest point thereof, the solenoid is prevented from being biased and the hook 564 rotates in the clockwise direction. The engagement groove 566 of the hook 564 engages with the rear striker 42. Next, the pawl 568 rotates in the clockwise direction to engage with the engagement projection 567 of the hook 564. As a result, the release operation of the hook 564 is prohibited. Accordingly, the rear leg 52 is locked at the vehicle floor 91 so that the relative movement of the rear leg 52 in the longitudinal direction of the vehicle is restricted.

Because of the locked state of each of the rear legs 52 (left and right rear legs), the locked state of each of the front legs 51 (left and right front legs), the cushion frame 24 is locked at the vehicle floor 91 via four portions in total, i.e., the seat 2 is locked at the seating position P1.

In the release operation of the rear lock device 56, the solenoid of the rear open device is biased to rotate the pawl 568 in the counterclockwise direction. The hook 564 then rotates in the counterclockwise direction. As a result, the engagement groove 562 is opened. In such state, when the rear leg 52 moves rearward and upward from the engaged position, the rear striker 42 relatively moves forward and downward so that the rear striker 42 disengages from the engagement groove 562. The rear leg 52 disengages from the rear striker 42 accordingly. Afterwards, the solenoid is prevented from being biased and the hook 564 rotates in the clockwise direction. Next, the pawl 568 rotates in the clockwise direction to engage with the engagement projection 567 of the hook 564 and consequently the release operation of the rear lock device 56 is terminated.

The four-link mechanism 3 serves as a seat moving mechanism according to the present embodiment. The four-link mechanism 3 includes mechanism body portions 31 provided at both sides of the seat 2 in the vehicle width direction and the mechanism drive portion 35 that mutually drives both the mechanism body portions 31. As illustrated in FIGS. 2 to 4, each of the mechanism body portions 31 includes a first link 32 and a second link 33. The first link 32 and the second link 33, provided at one of the sides of the seat 2 in the vehicle width direction, and the first link 32 and the second link 33, provided at the other one of the sides of the seat 2, are symmetrically formed so as to operate synchronously. One end of the first link 32 provided at an upper side is supported at a portion slightly rearward relative to a center of the cushion frame 24 so as to form a first seat support point 321. The other end of the first link 32 provided at a lower side is supported at a front lower portion of the seat stowing space 92 so as to form a first floor support point 322. One end 331 of the second link 33 provided at an upper side is fixed to a rear portion of the rear leg 52 so as to integrally operate therewith. The other end 332 of the second link 33 provided at a lower side is supported at a front bottom surface of the seat stowing space 92. That is, the mechanism body portion 31 is constituted by a rectangular-shaped link mechanism having the first link 32 serving as a first side, the cushion frame 24 serving as a second side, the rear leg 52 and the second link 33 integrally operated to serve as a third side, and the vehicle floor 91 within the seat stowing space 92 serving as a fourth side.

The mechanism drive portion 35 is provided at the cushion frame 24 as illustrated in FIGS. 2 to 4 and 6. The mechanism drive portion 35 includes a drive motor 36, a speed reduction mechanism 37 decreasing a drive force of the drive motor 36 to generate a large torque, and the shaft 38 transmitting the drive force to both the left and right rear legs 52. The shaft 38 is pivotally supported by the cushion frame 24. A two-chamfered portion of the shaft 38 is fitted to the two-chamfered bores 521 of the respective rear legs 52 so that the shaft 38 and the rear legs 52 rotate integrally. The mechanism drive portion 35 includes a function for changing an angle formed between the cushion frame 24 and each of the rear legs 52. Thus, the angle formed between the second side and the third side of the mechanism body portion 31 is changed so as to change the rectangular shape of the link mechanism to thereby move the seat 2.

In addition, as illustrated in FIGS. 5 and 6, the bracket 354 is provided at the shaft 38 so as to integrally rotate therewith. Then, the second end of the stranded cable 59 is connected to the bracket 354 as mentioned above. When the shaft 38 rotates in the clockwise direction, the bracket 354 pulls the stranded cable 59 to thereby bring the front leg 51 from the seating state to the stowed state. That is, the mechanism drive portion 35 functions as a drive portion of the leg rotation mechanism in addition to a drive portion of the mechanism body portion 31 of the four-link mechanism 3.

Figure 11:
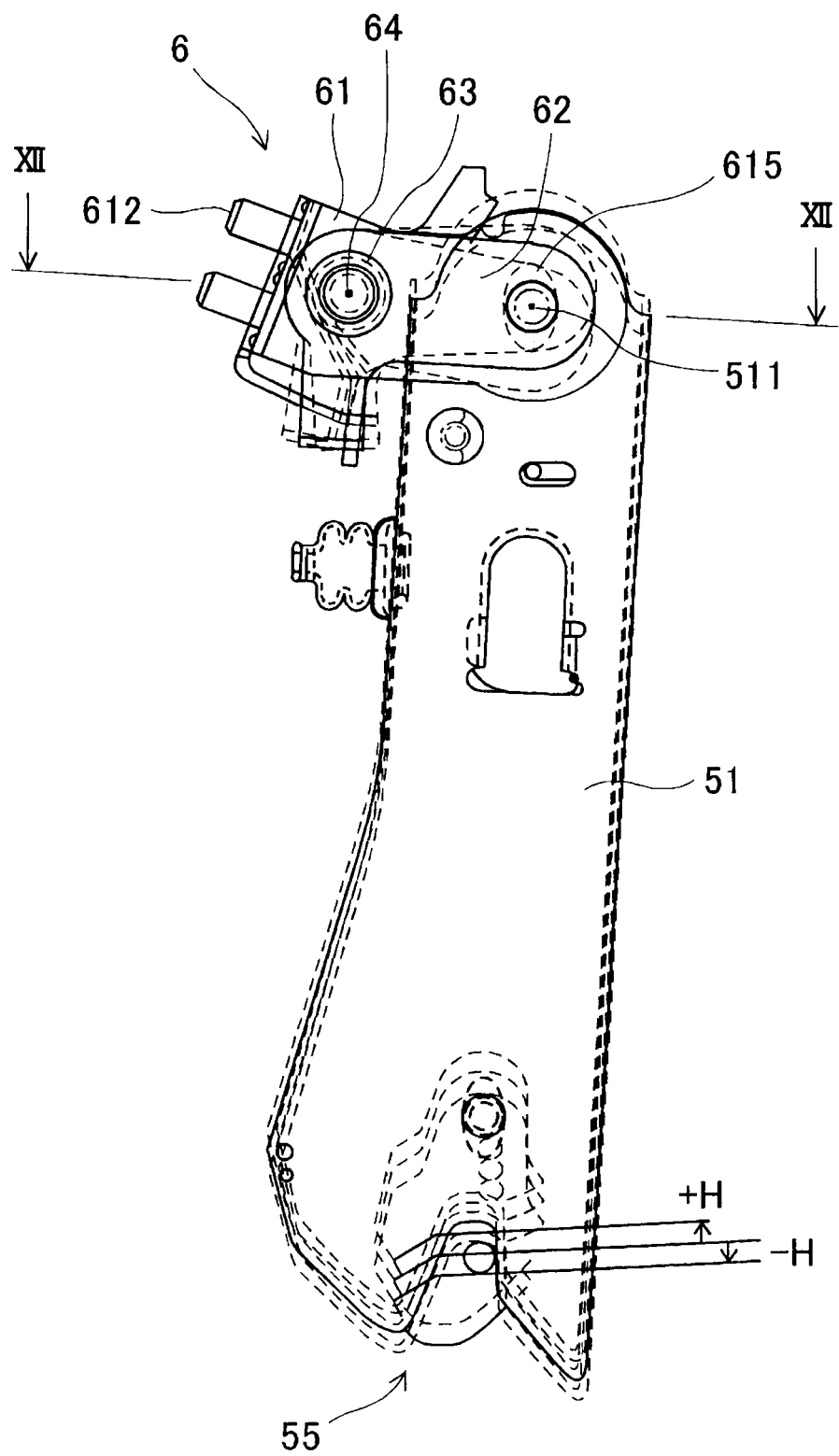
FIG. 11 is an enlarged side view of a leg height adjusting mechanism and the front leg of which height is adjustable according to the first embodiment.
Figure 13:
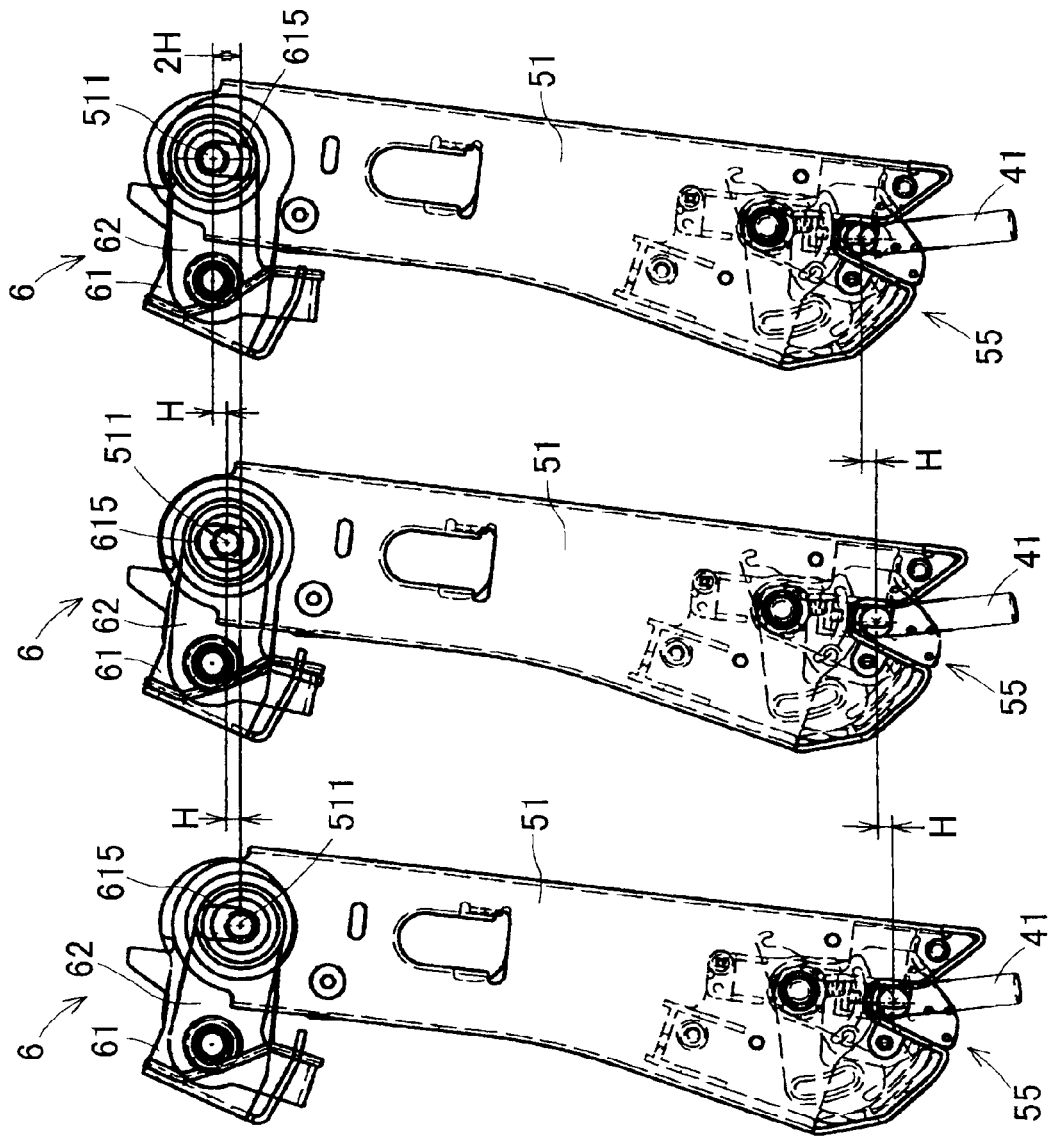
FIGS. 13A to 13C are diagrams each explaining a moving range of the front leg in a vertical direction relative to a base bracket by means of the leg height adjusting mechanism shown in FIG. 11, specifically.

The leg height adjusting mechanism 6 serves as an engagement position adjusting mechanism according to the present embodiment. The leg height adjusting mechanism 6 adjusts a position of either the left or the right front leg 51 in the vertical direction. The vertical direction corresponds to the engaging movement locus direction when the front lock device 55 moves downward for the engagement operation. FIG. 11 is an enlarged side view of the leg height adjusting mechanism 6 and the front leg 51 of which height is adjustable. FIG. 12 is a cross-sectional view taken along line XII-XII shown in FIG. 11. The leg height adjusting mechanism 6 includes a base bracket 61, trailing arms 62, and a spring member 63.

The base bracket 61 is formed into a substantially U-shape when viewed from an upper side as illustrated in FIG. 12. A fixed portion 611 formed at a center of the U-shape of the base bracket 61 is fixed to the cushion frame 24 via two fitting bolts 612. Two support portions 613 formed at respective sides of the center portion of the U-shape of the base bracket 61 are away from and in parallel to each other while having a distance larger at a portion close to the fixed portion 611 and having a distance smaller at a portion away from the fixed portion 611. A circular-shaped fixed bore 614 is formed at the portion of the support portions 613 close to the fixed portion 611 where the two support portions 613 are separated from each other, having the larger distance. A fixed pin 64 is rotatably inserted into the fixed bore 614. As illustrated in FIGS. 11 and 12, a vertically elongated bore 615 is formed at the portion of the support portions 613 away from the fixed portion 611 where the two support portions 613 are separated from each other, having the shorter distance. The rotational shaft 511 rotatably supported by the bearing member 513 of the front leg 51 is inserted into the elongated bore 615 so as to be movable in the vertical direction. In FIG. 11, the rotational shaft 511, the front leg 51, and the leg height adjusting mechanism 6 are each illustrated by a solid line in a state where the rotational shaft 511 is at an intermediate height of the elongated bore 615. The rotational shaft 511, the front leg 51, and the leg height adjusting mechanism 6 are each illustrated by a dashed line in a state where the rotational shaft 511 is at an upper end or a lower end of the elongated bore 615.

The trailing arms 62 are provided at outer sides of the two support portions 613 of the base bracket 61, respectively. Each of the trailing arms 62 is formed into a substantially plate shape. A circular-shaped fixed bore 621 is formed at left portions of the trailing arms 62 as shown in FIG. 12 and is fixed by the fixed pin 64. In addition, a circular-shaped biasing bore 622 is formed at right portions of the training arms 62 as shown in FIG. 12. The rotational shaft 511 of the front leg 51 is fixed to the biasing bore 622.

The spring member 63 is a coil spring wound on the fixed pin 64. One end of the spring member 63 engages with the base bracket 61 while the other end of the spring member 63 engages with the trailing arm 62. The spring member 63 biases the trailing arms 62 in the clockwise direction relative to the base bracket 61. The spring member 63 also biases the rotational shaft 511 fixed to the trailing arms 62 downwardly. Accordingly, in a case where no external force is applied, the rotational shaft 511 is in contact with the lower end of the elongated bore 615.

FIGS. 13A, 13B, and 13C each explain a moving range of the front leg 51 in the vertical direction relative to the base bracket 61. FIG. 13A illustrates a state where the front leg 51 is arranged at a lowest position. FIG. 13B illustrates a state where the front leg 51 is arranged at an intermediate position serving as a base position. FIG. 13C illustrates a state where the front leg 51 is arranged at a highest position. In FIG. 13A where the front leg 51 is in the lowest position, the rotational shaft 511 is positioned at the lower end of the elongated bore 615. In FIG. 13B where the front leg 51 is in the base position, the rotational shaft 511 is positioned at the intermediate height of the elongated bore 516. In FIG. 13C where the front leg 51 is in the highest position, the rotational shaft 511 is positioned at the upper end of the elongated bore 615. That is, the rotational shaft 511 moves in the vertical direction relative to the base position within +/− H of a height adjustment range. Specifically, the rotational shaft 511 is movable by a height 2H in the vertical direction. At this time, because the front lock device 55 provided at the lower end of the front leg 51 moves in the vertical direction within +/− H of the height adjustment range, the front lock device 55 is engageable with the front striker 41 even when a height of the front striker 41 varies.

Figure 14:
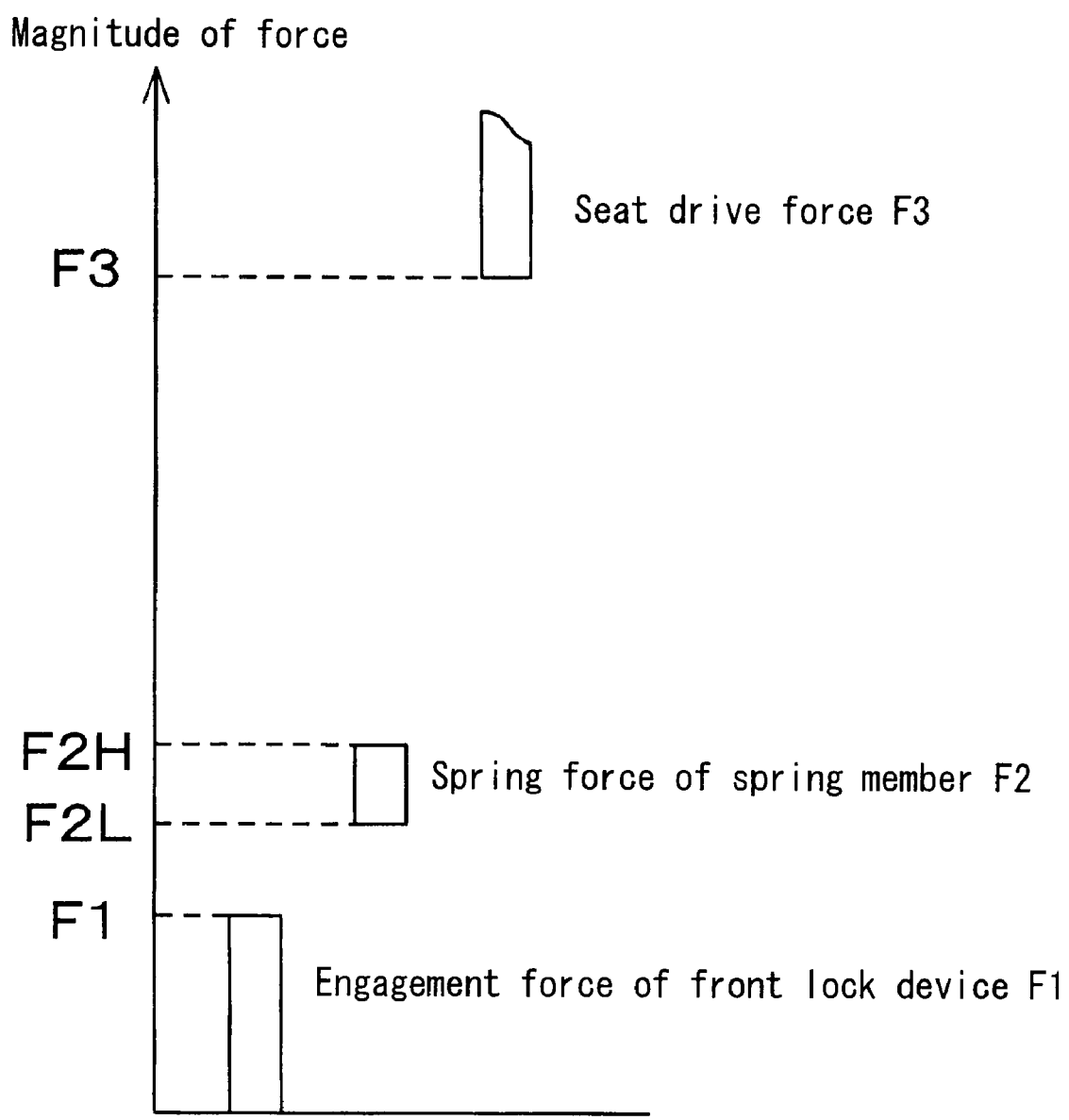
FIG. 14 is a diagram explaining a magnitude of a spring force of a spring member used in the leg height adjusting mechanism shown in FIG. 11.

A spring force F2 of the spring member 63 for biasing the trailing arms 62 and the rotational shaft 511 satisfies a relationship illustrated in FIG. 14. FIG. 14 is a diagram explaining a magnitude of the spring force F2 of the spring member 63 used in the leg height adjusting mechanism 6. The spring force F2 of the spring member 63 varies within a range from a maximum value F2H to a minimum value F2L depending on the height of the rotational shaft 511 within the elongated bore 615, a manufacturing tolerance, and the like. The minimum value F2L is specified to be larger than an engagement force F1 required for the front lock device 55 to engage with the front striker 41. In addition, when the seat 2 moves to the seating position P1, a seat drive force F3 obtained by adding a weight of the seat 2 to the drive force of the four-link mechanism 3 is generated. The maximum value F2H of the spring force F2 of the spring member 63 is specified to be smaller than the seat drive force F3.

Because the aforementioned relationship is satisfied, the engagement operation of the front lock device 55 is given priority when the seat 2 moves to the seating position P1. Then, the leg height adjusting mechanism 6 adjusts the height relationship between the front leg 51 and the cushion frame 24.

Figure 15:
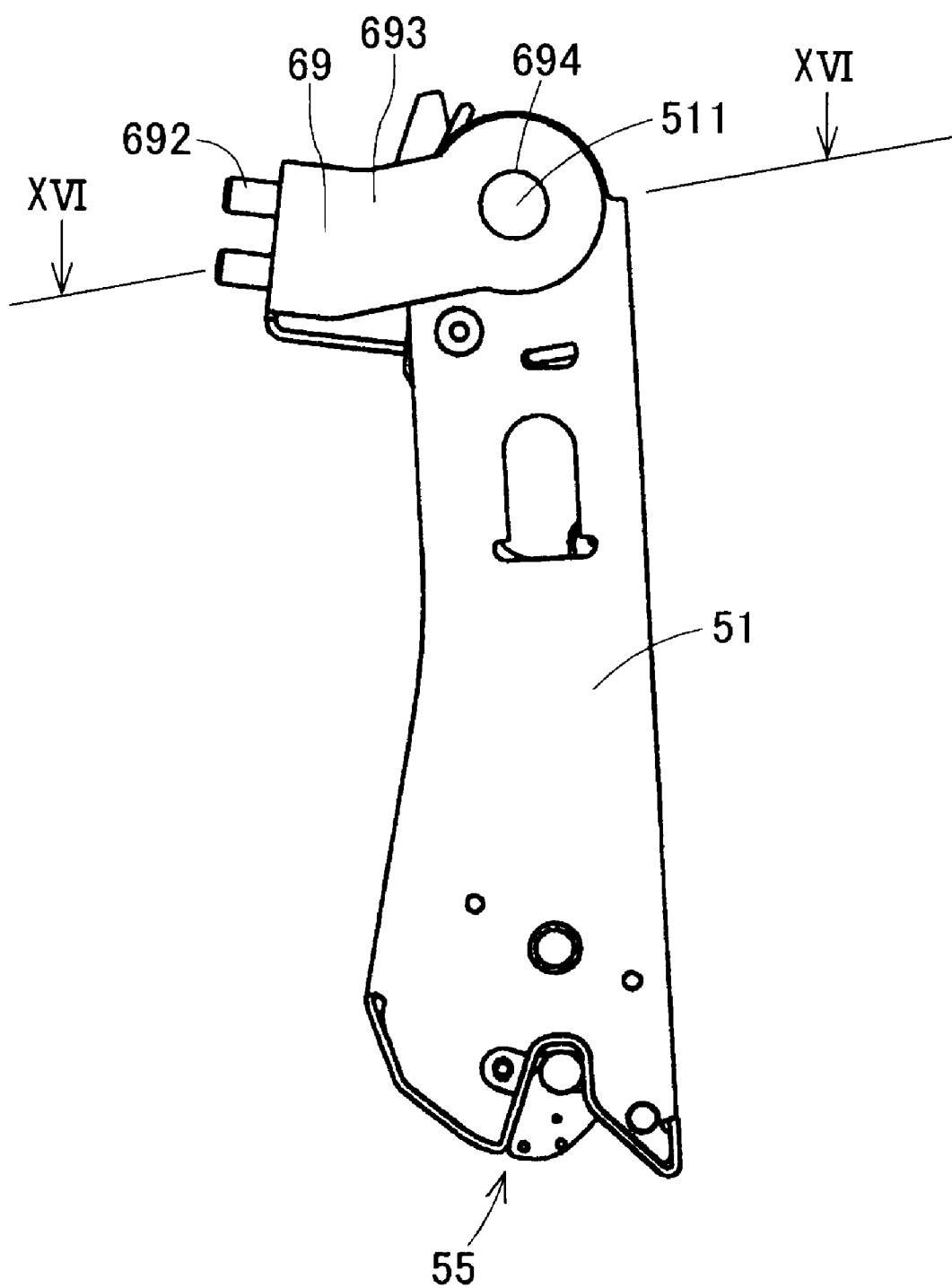
FIG. 15 is an enlarged side view illustrating the front leg on which the height adjustment is not performed according to the first embodiment.
Figure 16:
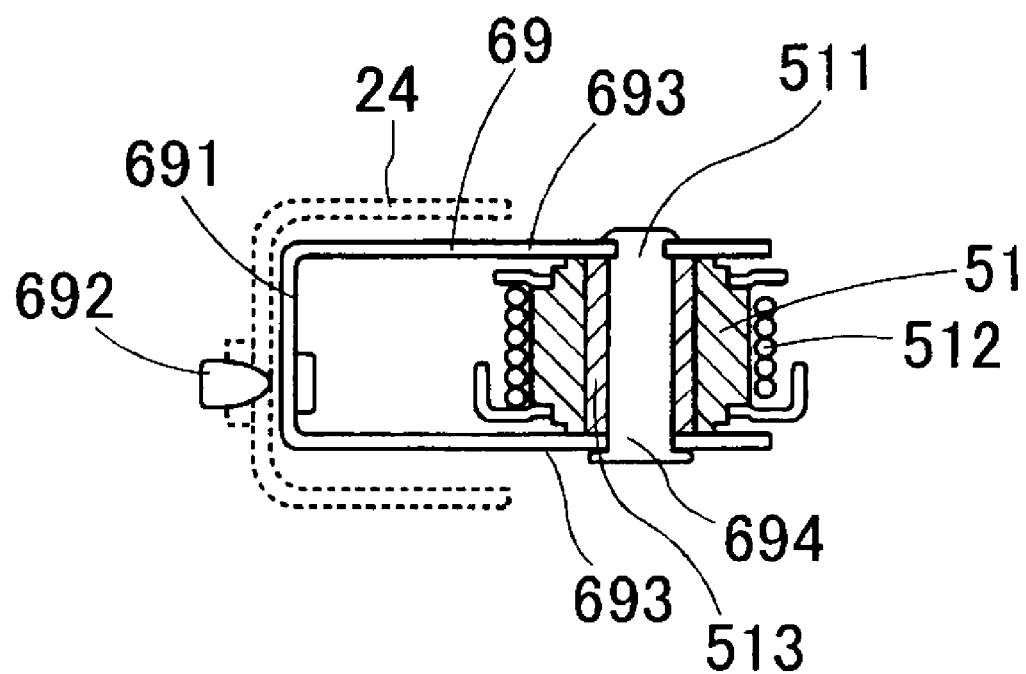
FIG. 16 is a cross-sectional view taken along line XVI-XVI in FIG. 15.

On the other hand, the front leg 51 on which the height adjustment is not performed (hereinafter referred to as the non-adjusted front leg 51) is supported in a manner illustrated in FIGS. 15 and 16. FIG. 15 is an enlarged side view illustrating the front leg 51 on which the height adjustment is not performed. FIG. 16 is a cross-sectional view taken along line XVI-XVI shown in FIG. 15. A base bracket 69 of the non-adjusted front leg 51 is formed into a substantially U-shape when viewed from an upper side as illustrated in FIG. 16. A fixed portion 691 formed at a center of the U-shape of the base bracket 69 is fixed to the cushion frame 24 via two fitting bolts 692. A circular-shaped support bore 694 is formed at two support portions 693, which are formed at respective sides of the center portion of the U-shape of the base bracket 69. The rotational shaft 511 is fixed to the support bore 694. The rotational shaft 511 supports the front leg 51 via the bearing member 513 so that the front leg 51 is rotatable.

The height of the support bore 694 is specified to be equal to the intermediate height of the elongated bore 615 of the leg height adjusting mechanism 6 relative to the cushion frame 24. Thus, when no external force is applied, the front leg 51 at which the leg height adjusting mechanism 6 is provided is positioned lower than the non-adjusted front leg 51 by the height adjustment range H.

Next, an operation of the seat apparatus 1 according to the first embodiment having the aforementioned structure will be explained below. In the following, operations of only the components provided at the left side of the seat 2 in the width direction of the vehicle are mainly explained, however, the components provided at the right side of the seat 2 are operated in the substantially same manner. Differences between the left and rights sides of the seat 2 will be additionally explained.

The stowing operation for moving the seat 2 from the seating position P1 to the stowed position P2 will be explained. In the stowing operation, first, the seatback 22 is folded down when the seat 2 is in the seating position P1 and the headrest 23 rotates to be brought in a position illustrated in FIG. 2. Next, the solenoid of the front open device of the front lock device 55 is biased to thereby rotate the hook 554 in the clockwise direction. Consequently, the engagement groove 552 is opened. At the same time, the solenoid of the rear open device of the rear lock device 56 is biased to thereby rotate the pawl 568 and then the hook 564 in the counterclockwise direction. As a result, the engagement groove 562 is opened. Then, the drive motor 36 of the four-link mechanism 3 is driven in one direction so as to drive the shaft 38 to rotate in the clockwise direction in FIG. 5. The angle formed by the cushion frame 24 and the second link 33 those of which constitute the mechanism body portion 31 decreases so that the seat 2 moves from the seating position P1 to the stowed position P2 as illustrated by an arrow R in FIG. 2. At an early stage of the movement of the seat 2 from the seating position P1 to the stowed position P2, the front lock device 55 provided at the lower end of the front leg 51 moves substantially upward while the rear lock device 56 provided at the lower end of the rear leg 52 moves rearward and upward at substantially 45 degrees. When the seat 2 starts moving, the front lock device 55 and the rear lock device 56 have already been unlocked relative to the respective strikers 41 and 42 so that the front striker 41 and the rear striker 42 never interfere with the movement of the seat 2.

In association with the movement of the shaft 38 in the clockwise direction in FIG. 5, the rear leg 52 rotates in the clockwise direction so that the rear leg 52 is gradually turning sideways. Further, in association with the movement of the shaft 38, the stranded cable 59 is pulled rearward, thereby rotating the front leg 51 in the counterclockwise direction to be gradually turning sideways. Rotations of the front leg 51 and the rear leg 52 are conducted simultaneously with the movement of the seat 2. As illustrated in FIG. 3, the front leg 51 and the rear leg 52 are folded down at a lower side of the cushion frame 24. The front leg 51 and the rear leg 52 are each eventually brought in the stowed state as illustrated in FIG. 4 so as to be arranged in parallel to the lower surface of the seat cushion 24. The seat 2 is stowed in the stowed position P2 accordingly.

Afterwards, the solenoid of the front open device is prevented from being biased so that the hook 554 rotates in the counterclockwise direction. At the same time, the solenoid of the rear open device is prevented from being biased, thereby rotate the hook 564 in the clockwise direction. Then, the pawl 568 rotates in the clockwise direction.

Next, a lock operation for moving the seat 2 from the stowed position P2 to the seating position P1 to be locked at the vehicle floor 91 will be explained. The moving locus of the seat 2 in the lock operation is obtained by substantially following backwards the moving locus of the seat 2 in the stowing operation. In the lock operation, the solenoid of the rear open device is first biased to thereby rotate the pawl 568 and then the hook 564 in the counterclockwise direction. The engagement groove 562 is opened accordingly. Next, the drive motor 36 of the four-link mechanism 3 is driven in the other direction to drive the shaft 38 to rotate in the counterclockwise direction in FIG. 5. Then, the angle formed by the cushion frame 24 and the second link 33 increases so that the seat 2 starts moving upward from the stowed position P2. The seat 2 then moves forward and thereafter diagonally forward and downward to reach the seating position P1.

In association with the movement of the shaft 38 in the counterclockwise direction in FIGS. 3 and 4, the rear leg 52 also rotates in the counterclockwise direction so as to gradually rise. Further, in association with the movement of the shaft 38, the stranded cable 59 is released forward. The front leg 51 is biased by the leg rotation spring 512 to rotate in the clockwise direction, thereby bringing the front leg 51 to gradually rise. The front leg 51 and the rear leg 52 rotate simultaneously with the movement of the seat 2. When the seat 2 arrives the seating position P1, the front leg 51 and the rear leg 52 are raised and each brought in the seating state.

The front leg 51 and the rear leg 52, each in the seating state, reach the front striker 41 and the rear striker 42, respectively, at substantially the same time or in a state where the rear leg 52 is slightly ahead of the front leg 51. The rear lock device 56 approaches the rear striker 42 from an upper rear direction and then leads the rear striker 42 into the engagement groove 562. When the rear striker 42 is inserted deeply enough into the engagement groove 562, the solenoid of the rear open device is prevented from being biased so that the hook 564 and the pawl 568 rotates in the clockwise direction. As a result, the rear leg 52 is locked at the vehicle floor 91.

The front lock devices 55 of both the front legs 51 approach the respective front strikers 41 substantially from an upper direction. At this time, the front leg 51 at which the leg height adjusting mechanism 6 is provided (hereinafter referred to as the adjusted front leg 51) is arranged lower than the front leg 51 at which the leg height adjusting mechanism 6 is not provided (hereinafter referred to as the fixed front leg 51) by the height adjustment range H. However, because of a manufacturing tolerance, a variation in mounting height of each component, an inclination of the seat 2, and the like, a height relationship between the front lock device 55 and the front striker 41 varies. Herein, a case where the front legs 51 are each arranged at a regular height and the front strikers 41 vary in height direction will be explained as an example.

Figure 17:
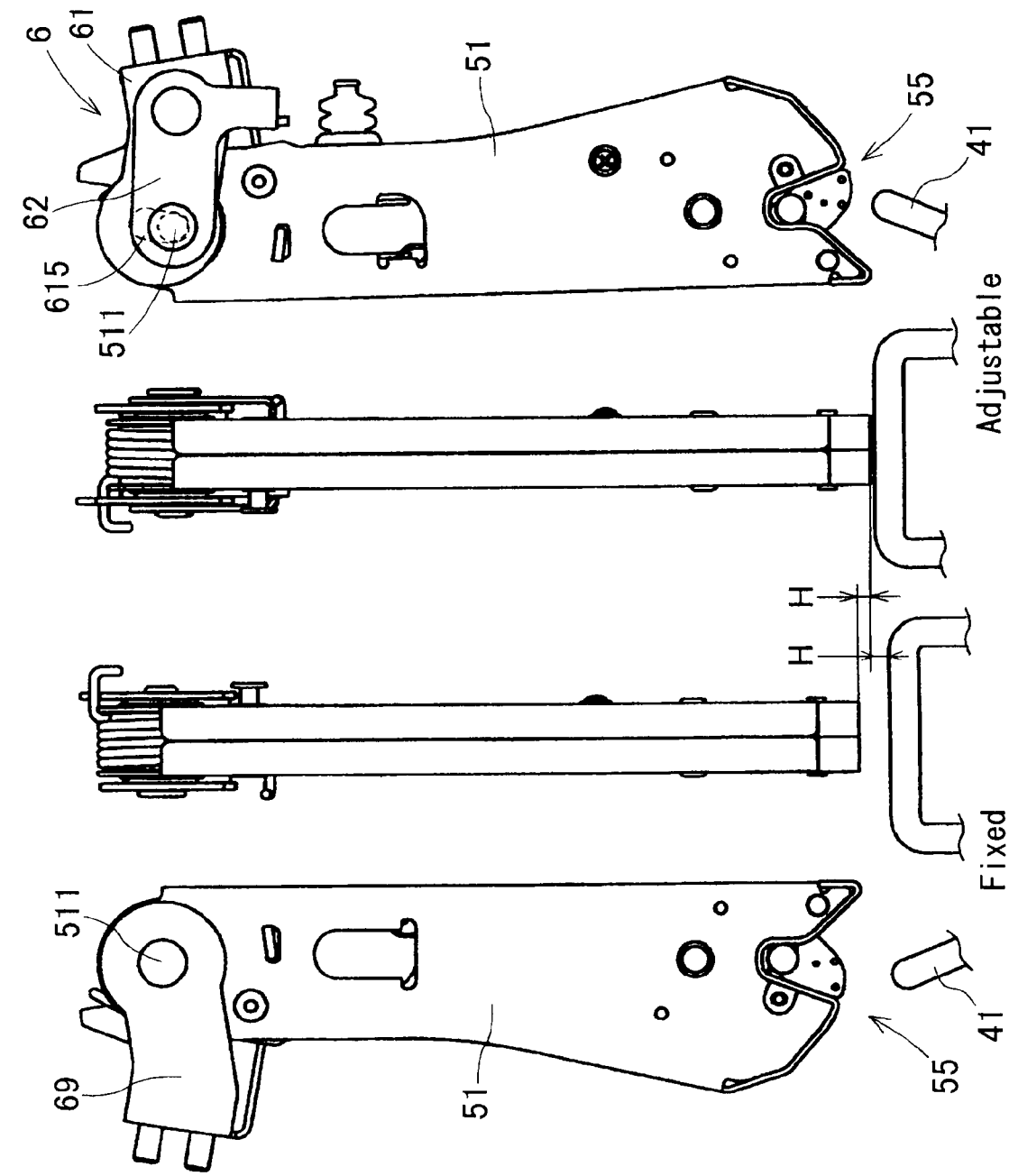
FIG. 17 is a diagram explaining a state where an adjusted-side front leg approaches an adjusted-side front striker of which relative height is greater than a fixed-side front striker according to the first embodiment.
Figure 18:
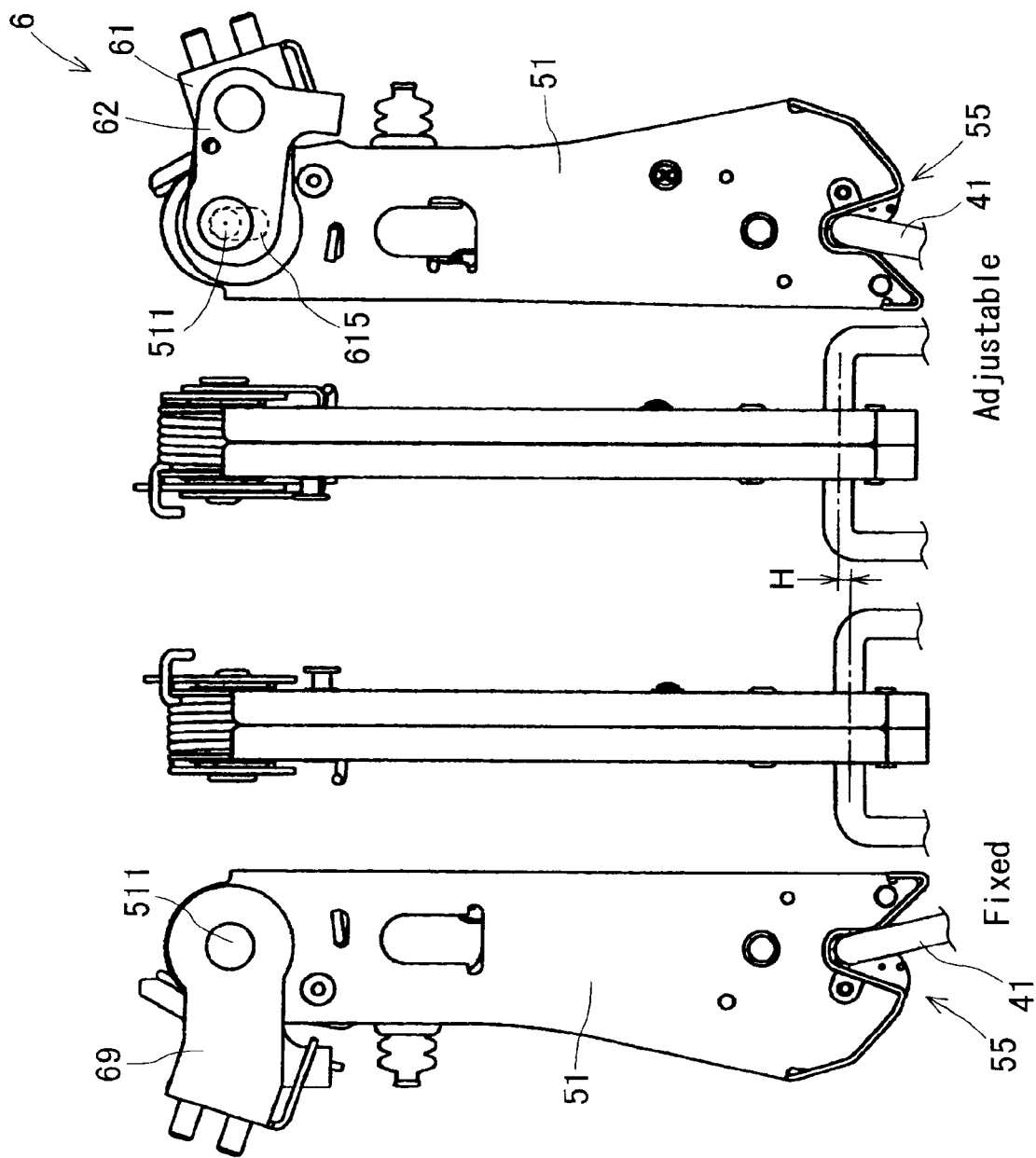
FIG. 18 is a diagram explaining a state where the adjusted-side front leg engages with the adjusted-side front striker of which relative height is greater than the fixed-side front striker according to the first embodiment.
Figure 19:
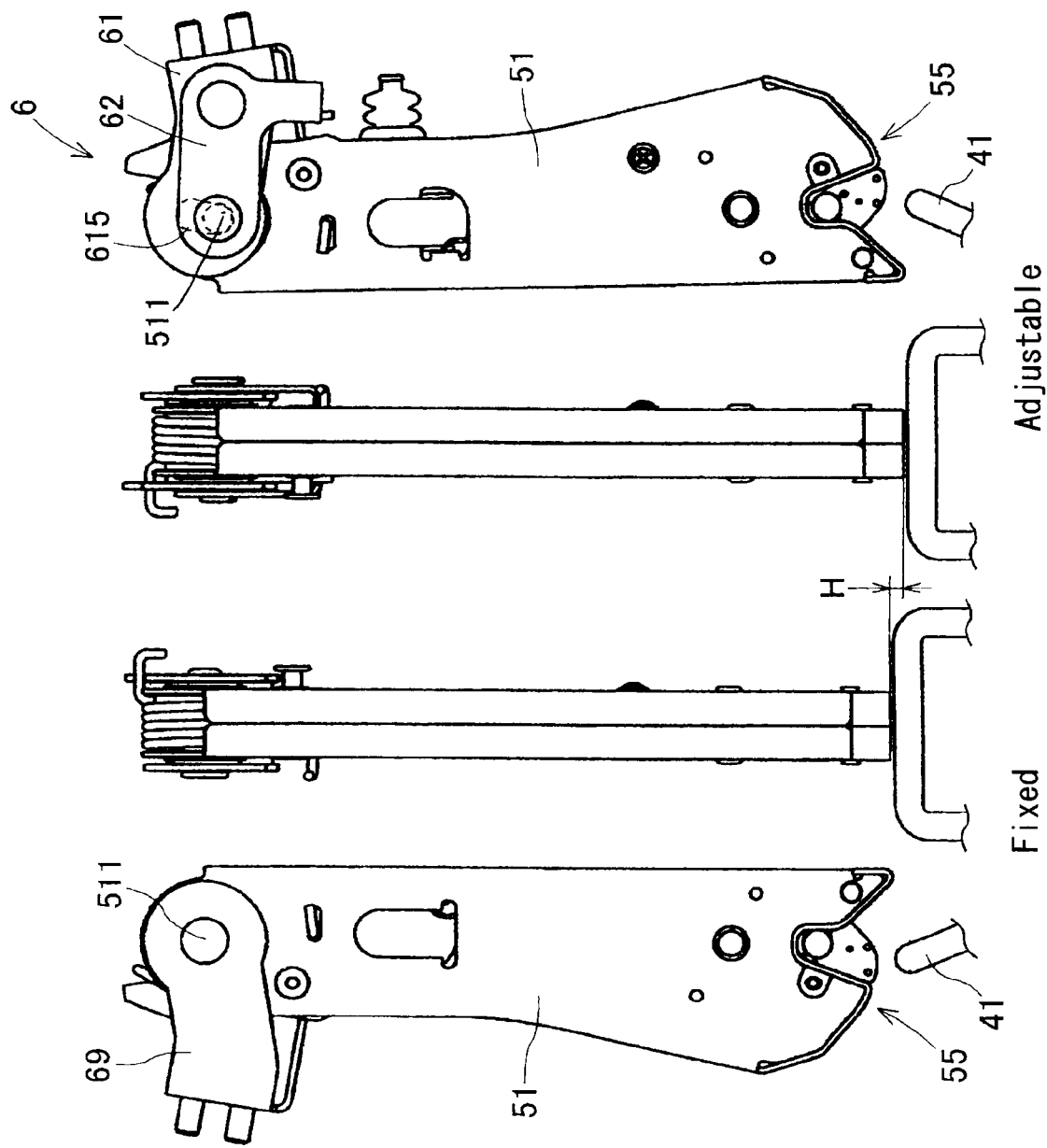
FIG. 19 is a diagram explaining a state where the adjusted-side front leg approaches the adjusted-side front striker of which relative height is smaller than the fixed-side front striker according to the first embodiment.
Figure 20:
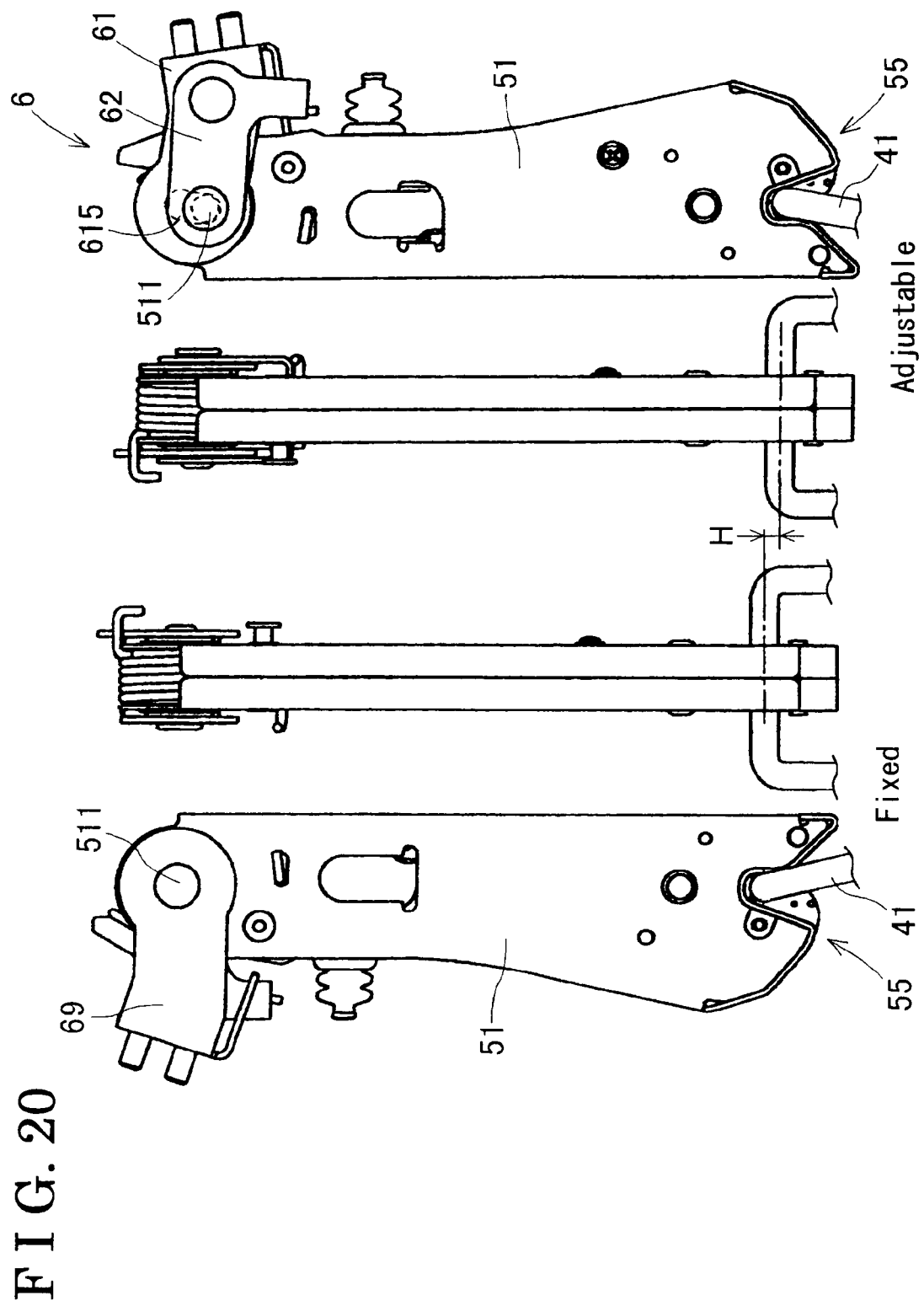
FIG. 20 is a diagram explaining a state where the adjusted-side front leg engages with the adjusted-side front striker of which relative height is smaller than the fixed-side front striker according to the first embodiment.

FIGS. 17 to 20 are diagrams each explaining the engagement operation in a case where the front strikers 41 vary in height by a height H that is the same value as the height adjustment range H. More specifically, FIGS. 17 and 18 are diagrams each explaining a case where the front striker 41, engageable with the adjusted front leg 51 (hereinafter referred to as the adjusted-side front striker 41), is higher than the front striker 41, engageable with the fixed front leg 51 (hereinafter referred to as the fixed-side front striker 41). FIGS. 19 and 20 are diagrams each explaining a case where the fixed-side front striker 41 is higher than the adjusted-side front striker 41. In each of FIGS. 17 to 20, a side view (a left lateral view) and a front view of the fixed front leg 51, a front view and a side view (a right lateral view) of the adjusted front leg 51 are illustrated in order from left to right.

In FIG. 17, the relative height of the front lock device 55 of the adjusted front leg 51 illustrated at the right side (hereinafter referred to as the adjusted-side front lock device 55) to the front lock device 55 of the fixed front leg 51 illustrated at the left side (hereinafter referred to as the fixed-side front lock device 55) is lower by the height H. The relative height of the adjusted-side front striker 41 is higher than the fixed-side front striker 41. Thus, when the cushion frame 24 moves downward in the state shown in FIG. 17, the adjusted-side front lock device 55 first starts to engage with the front striker 41. When the cushion frame 24 further moves downward, the adjusted-side front lock device 55 cannot move downward any further. The rotational shaft 511 of the adjusted front leg 51 cannot move downward and thus the base bracket 61 moves downward against the biasing force of the spring member 63. That is, the rotational shaft 511 moves relatively upward within the elongated bore 615. While the rotational shaft 511 is moving upward within the elongated bore 615, the fixed-side front lock device 55 starts to engage with the front striker 41. As a result, the adjusted-side front lock device 55 and the fixed-side front lock device 55 engage with the respective front strikers 41 so that the engagement state illustrated in FIG. 18 is obtained.

In the engagement state as illustrated in FIG. 18, the rotational shaft 511 of the adjusted front leg 51 is positioned at the upper end of the elongated bore 615. The adjusted front leg 51 and the fixed front leg 51 are both locked at the vehicle floor 91.

Further, in FIG. 19, the relative height of the adjusted-side front lock device 55 illustrated at the right side to the fixed-side front lock device 55 illustrated at the left side is lower by the height H. In addition, the relative height of the adjusted-side front striker 41 is lower than the fixed-side front striker 41 by the height H. Thus, when the cushion frame 24 moves downward, the adjusted-side and fixed-side front lock devices 55 start to engage with the respective front strikers 41 at the same time. The both front lock devices 55 engage with the respective front strikers 41 so that the engagement state illustrated in FIG. 20 is obtained.

In the engagement state illustrated in FIG. 20, the rotational shaft 511 of the adjusted front leg 51 is arranged at the lower end of the elongated bore 615. The adjusted front leg 51 and the fixed front leg 51 are both locked at the vehicle floor 91.

As mentioned above, even when a distance between the adjusted-side front lock device 55 and the corresponding front striker 41 and a distance between the fixed-side front lock device 55 and the corresponding front striker 41 are different from each other within +/− H of the adjustment range defined on the basis of the base position of the front leg 51, i.e., the height 2H, the height of the rotational shaft 511 is adjusted within the elongated bore 615 and both the front legs 51 are locked at the vehicle floor 91. In FIGS. 17 through 20, the case where the heights of the front strikers 41 vary, i.e., the relative height between the adjusted-side and the fixed side front strikers 41 is different, is explained. In addition, the adjustment in height direction is also conducted in a case where heights of the cushion frames 24, the base brackets 61, the front legs 51 or the like vary.

The aforementioned first embodiment includes the four-link mechanisms 3 each serving as the seat moving mechanism, the four legs 51 and 52 and the lock devices 55 and 56, which are provided at the lower ends of the respective four legs 51 and 52, each serving as the engagement member, and the leg height adjusting mechanism 6 serving as the engagement position adjusting mechanism that moves one of the front legs 51 in the vertical direction. Thus, even when distances between the front lock devices 55 and the respective front strikers 41 are different from each other at the time the seat 2 moves to the seating position P1, the height of one of the front leg 51 is adjusted so that the aforementioned difference in distance is eliminated. Accordingly, the four lock devices 55 and 56 securely engage with the respective strikers 41 and 42, which leads to the stable locking of the seat 2 at the seating position P1 via four portions.

The first embodiment further includes the leg rotation mechanism and thus the legs 51 and 52 are each in the stowed state when the seat 2 is in the stowed position P2, thereby achieving a compact stowing of the seat 2.

Figure 21:
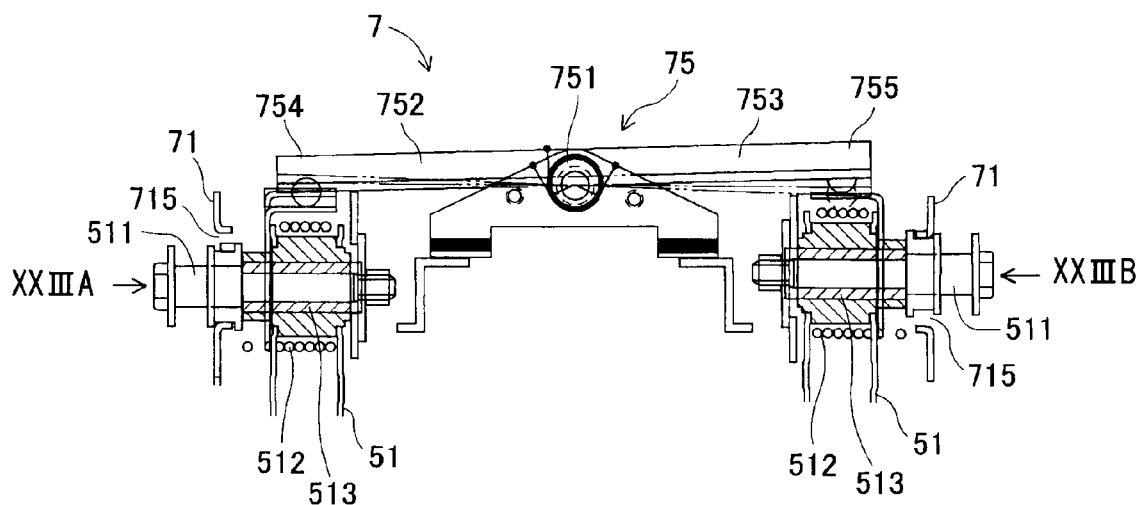
FIG. 21 is a front view illustrating a main portion of a seat apparatus for a vehicle including a balancing link according to a second embodiment.
Figure 22:
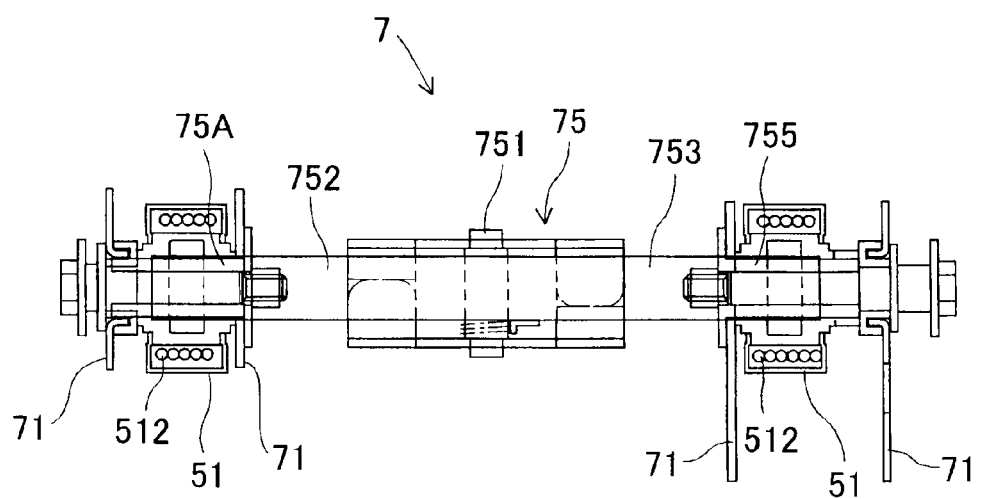
FIG. 22 is a plan view illustrating the main portion of the seat apparatus shown in FIG. 21.
Figure 23A:
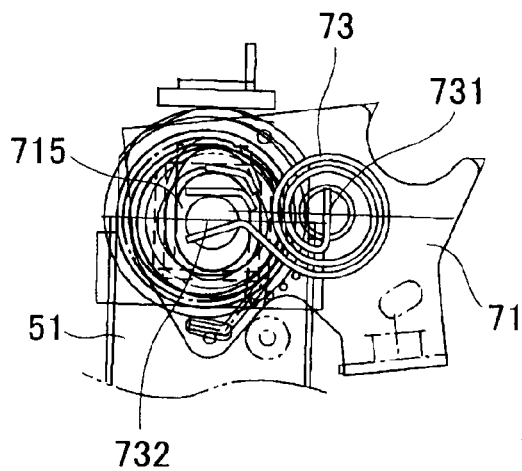
FIG. 23A is side view of the main portion of the seat apparatus when viewed from XXIIIA direction shown in FIG. 21.
Figure 23B:
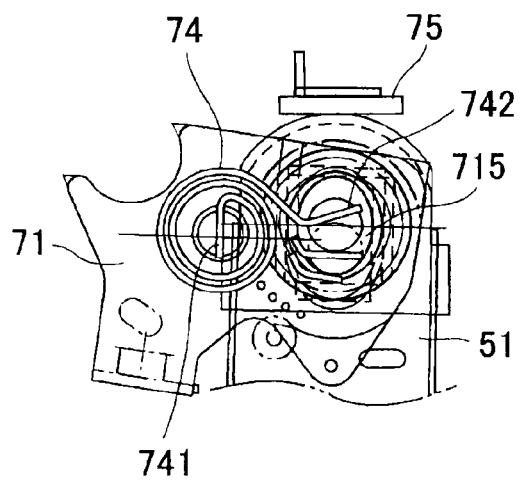
FIG. 23B is a side view of the main portion of the seat apparatus when viewed from XXIIIB direction shown in FIG. 21.

Next, a second embodiment in which a balancing mechanism serving as the engagement position adjusting mechanism is constituted by a balancing link will be explained with reference to FIGS. 21 to 23. In the following, differences of the second embodiment from the first embodiment will be mainly explained. FIG. 21 is a front view illustrating a main portion of a seat apparatus for a vehicle according to the second embodiment including the balancing link. FIG. 22 is a plan view illustrating the main portion. FIG. 23A is a side view illustrating the main portion viewed from XXIIIA direction shown in FIG. 21. FIG. 23B is a side view illustrating the main portion viewed XXIIIB direction shown in FIG. 21. In FIGS. 21 through 23, left and right directions oppositely correspond to right and left directions of the seat for the vehicle. The seat apparatus according to the second embodiment includes the seat 2, the four-link mechanisms 3, the front strikers 41, the rear strikers 42, the front legs 51, the rear legs 52, the front lock devices 55, the rear lock devices 56, and a balancing mechanism 7. The components other than the balancing mechanism 7 are constituted substantially in the same manner as the first embodiment.

The balancing mechanism 7 adjusts the heights of both the front legs 51, i.e., the left front leg 51 (the front leg 51 shown on the right in FIG. 21) and the right front leg 51 (the front leg 51 shown on the left in FIG. 21), in a complementary manner. The balancing mechanism 7 includes a balancing link 75, base brackets 71 (left and right base brackets) provided at left and right sides of the balancing link 75, and spring members 74 and 73 provided at left and right sides of the balancing link 75. Each of the left and right base brackets 71 fixed to the cushion frame 24 includes a vertically elongated bore 715. The rotational shafts 511 rotatably supported by the respective front legs 51 are inserted into the elongated bores 715, respectively, so as to be movable in the vertical direction.

As illustrated in FIGS. 23A and 24A, the spring members 73 and 74 are spiral springs. One end 731 of the right spring member 73 engages with the right base bracket 71 while the other end 732 biases the rotational shaft 511 of the right front leg 51. In the same manner, one end 741 of the left spring member 74 engages with the base bracket 71 while the other end 742 biases the rotational shaft 511 of the left front leg 51. The spring member 73 biases the rotational shaft 511 of the right front leg 51 downward while the spring member 74 biases the rotational shaft 511 of the left front leg 51 upward. When no external force is applied, the relative position of the right front leg 51 (left side in FIG. 21) is lower than the left front leg 51 (right side in FIG. 21).

The balancing link 75 includes a support shaft 751 at a center and arms 752 and 753 that extend in opposite directions to each other from the support shaft 751, i.e., in the width direction of the vehicle (left and right direction of the vehicle). The support shaft 751 is supported by the cushion frame 24 and is rotatable in the left and right direction. The arms 752 and 753 extend to upper sides of the respective front legs 51. Top portions of the front legs 51 make contact with respective end portions 754 and 755 of the arms 752 and 753.

An operation of the seat apparatus according to the second embodiment will be explained below. The movement of the seat 2 by means of the four-link mechanisms 3, the engagement operations and the release operations of the lock devices 55 and 56 of the legs 51 and 52 are same as those of the first embodiment and thus explanations thereof will be omitted. When the seat 2 moves to the seating position P1 and then the cushion frame 24 moves downward, the right front lock device 55 (left side in FIG. 21) first engages with the corresponding front striker 41 because the relative height of the right front leg 51 (left side in FIG. 21) is lower than the left front leg 51 (right side in FIG. 21). Afterwards, the right front leg 51 does not move downward any further and the top portion of the right front leg 51 presses the end portion 754 of the right arm 752 upwardly. At this time, when the cushion frame 24 further moves downward, the support shaft 751 moves downward so that the balancing link 75 swings. The end portion 755 of the left arm 753 presses the left front leg 51 downward so that the left front leg 51 engages with the corresponding front striker 41. Such operation is conducted within a swing range of the balancing link 75. Thus, even when variations of height exist in both the front legs 51 and/or both the front strikers 41, the left and right front lock devices 55 securely engage with the respective front strikers 41, which leads to the secure engagement operations at both sides of the seat 2 in the width direction thereof.

The spring members 73 and 74 are provided for restraining unnecessary vibrations of the balancing link 75 in the vertical direction and may be omitted. In a case where the spring member 73 and 74 are not provided, the rotational shafts 511 of the left and right front legs 51 make contact with respective lower ends of the elongated bores 715 because of each weight of the legs 51. Then, the front leg 51 that first makes contact with the front striker 41 presses one of the end portions 754 and 755 of the balancing link 75 upwardly to thereby swing the balancing link 75. The other one of the end portions 754 and 755 moves the other leg 51 downwardly so that the other leg 51 makes contact with the front striker 41. Accordingly, the left and right front lock devices 55 engage with the respective front strikers 41 at substantially the same time.

As mentioned above, according to the second embodiment, the balancing link 75 of which both ends are in contact with the left and right front legs 51, respectively, are provided instead of the leg height adjusting mechanism 6 provided in the first embodiment. Accordingly, even in a case where a distance between the left front lock device 55 and the corresponding front striker 41 and a distance between the right front lock device 55 and the corresponding front striker 41 are different from each other at the time the seat 2 moves to the seating position P1, the balancing link 75 swings so that the heights of the left and right front legs 51 are complementarily adjusted to thereby eliminate the difference in the distances between the left and right front lock devices 55 and the respective front strikers 41. As a result, the left and right front lock devices 55 securely engage with the respective front strikers 41, which leads to the stable locking of the seat 2 at the seating position P1 via the four portions together with the rear lock devices 56 and the rear strikers 42.

Figure 24:
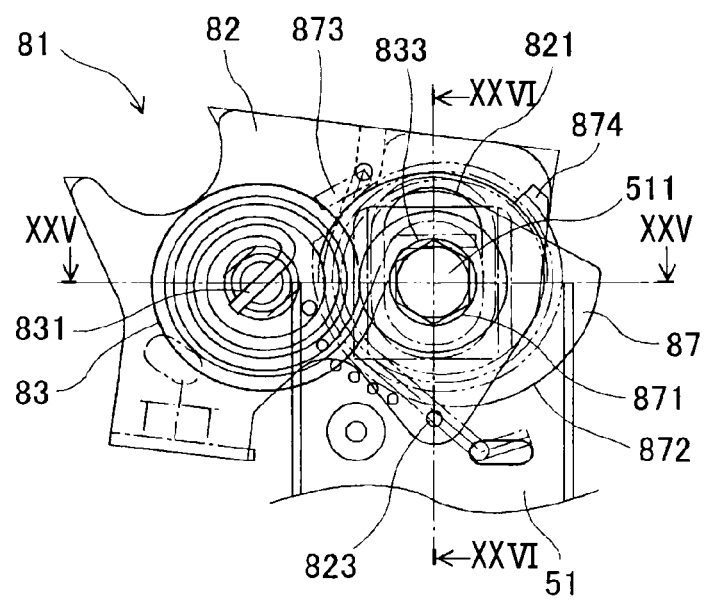
FIG. 24 is a side view illustrating a main portion of a seat apparatus for a vehicle including a cam member according to a third embodiment.
Figure 25:
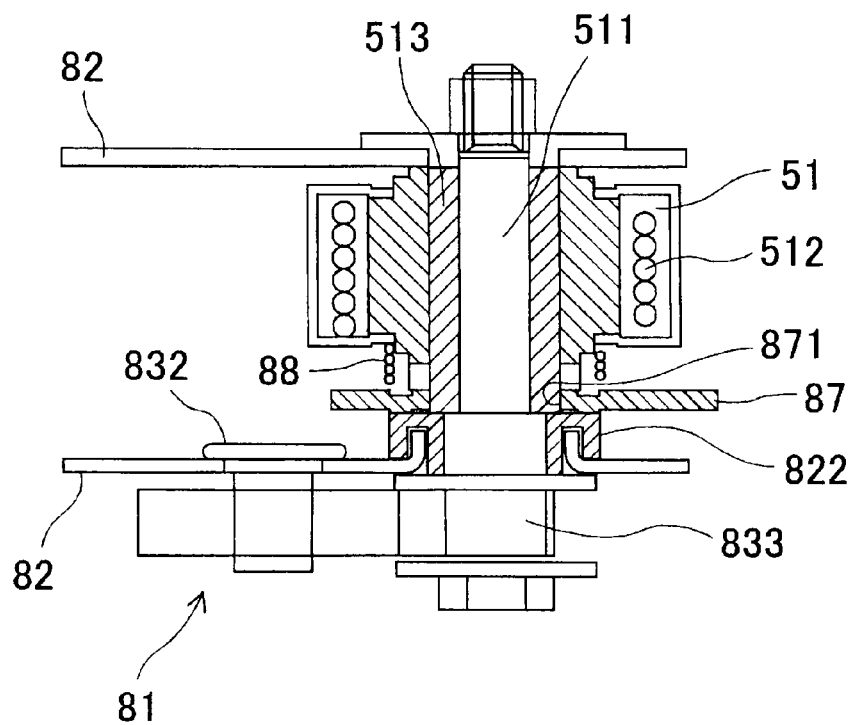
FIG. 25 is a cross-sectional view taken along line XXV-XXV shown in FIG. 24.
Figure 26:
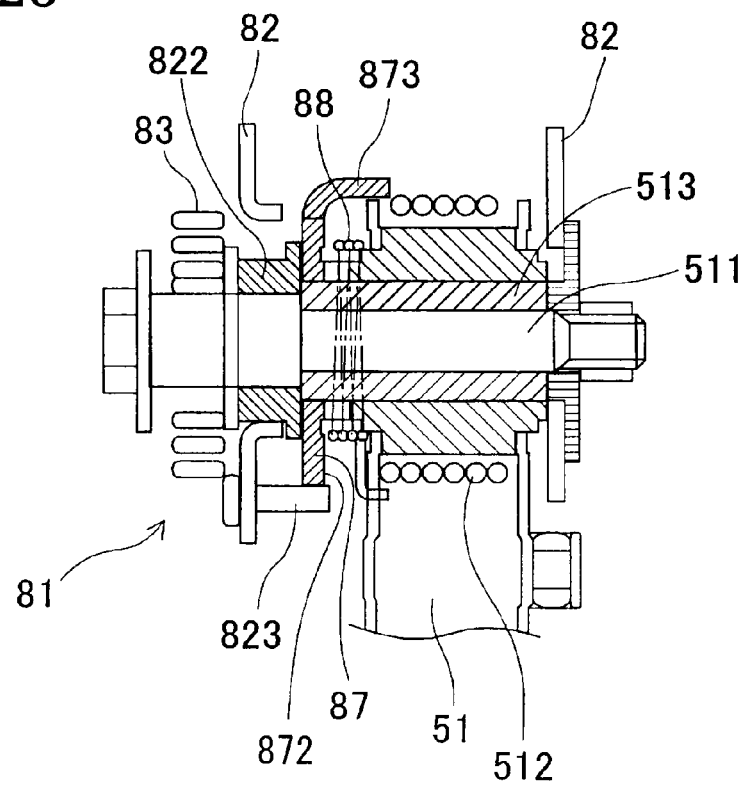
FIG. 26 is a cross-sectional view taken along line XXVI-XXVI shown in FIG. 24.

Next, a third embodiment including a cam member will be explained with reference to FIGS. 24 to 28. In the following, differences of the third embodiment from the first embodiment will be mainly explained. FIG. 24 is a side view illustrating a main portion of a seat apparatus for a vehicle according to the third embodiment. FIG. 25 is a cross-sectional view taken along line XXV-XXV shown in FIG. 24. FIG. 26 is a cross-sectional view taken along line XXVI-XXVI shown in FIG. 24. The seat apparatus according to the third embodiment includes the seat 2, the four-link mechanisms 3, the front strikers 41, the rear strikers 42, the front legs 51, the rear legs 52, the front lock devices 55, the rear lock devices 56, a leg height adjusting mechanism 81, a cam member 87, and a spring member 88. The seat 2, the four-link mechanisms 3, the front strikers 41, the rear strikers 42, the front legs 51, the rear legs 52, the front lock devices 55, and the rear lock devices 56 have the same structures as those of the first embodiment.

The leg height adjusting mechanism 81 of the seat apparatus according to the third embodiment serves as the engagement position adjusting mechanism. The leg height adjusting mechanism 81 adjusts a position of one of the front legs 51 in the height direction thereof. The leg height adjusting mechanism 8 includes a base bracket 82 and a spring member 83. The base bracket 82 is constituted by two plate-shaped members each of which includes a vertically elongated bore 821 as illustrated in FIG. 24. The two plate members of the base bracket 82 are fixedly arranged so as to be in parallel to the cushion frame 24. The rotational shaft 511 supported by each of the front legs 51 is inserted into the elongated bore 821 via a resin shoe 822 so as to be movable in the vertical direction. The spring member 83 is a spiral spring of which one end 831 engages with the base bracket 82 via a fixed pin 832 while the other end 833 of the spring member 83 biases the rotational shaft 511 of the front leg 51 downwardly.

The cam member 87 formed by a substantially plate member includes a support bore 871 at a center and a cam surface 872 of which diameter relative to the support bore 871 is gradually increasing towards a right side from a lower side in FIG. 24. The cam member 87 further includes a projection 873 at an upper left (see FIG. 24) so as to bend and project as illustrated in FIG. 26. The cam member 87 is arranged between the front leg 51 and one of the plate members of the base bracket 82. The support bore 871 of the cam member 87 is rotatably supported by the bearing member 513 that is fixed to the front leg 51 to support the rotational shaft 511. In addition, the cam member 87 is biased in the clockwise direction in FIG. 24 by means of the spring member 88 retained by the front leg 51. The clockwise direction corresponds to a forward direction and the counterclockwise direction corresponds to a rearward direction according to the present embodiment. An engagement pin 823 serving as an engaging member that engages with the cam surface 872 is provided to extend inwardly at a lower side of the elongated bore 821 of the base bracket 82 as illustrated in FIG. 26. Further, a pressing piece 874 is formed at the front leg 51 so as to make contact with the projection 873 of the cam member 87 when the front leg 51 rotates in the counterclockwise direction. The pressing piece 874 serves as a cam member backward movement mechanism.

The rotational shaft 511 of the front leg 51 on which the height adjustment is not performed is rotatably supported by the cushion frame 24 by means of a base bracket 84 that is constituted by two plate-shaped members each of which includes a circular-shaped fixed bore 841 as illustrated in FIG. 27. FIG. 27 illustrates an arrangement of the front leg 51 on which the height adjustment is not conducted.

Figures 28A, 28B, 28C:
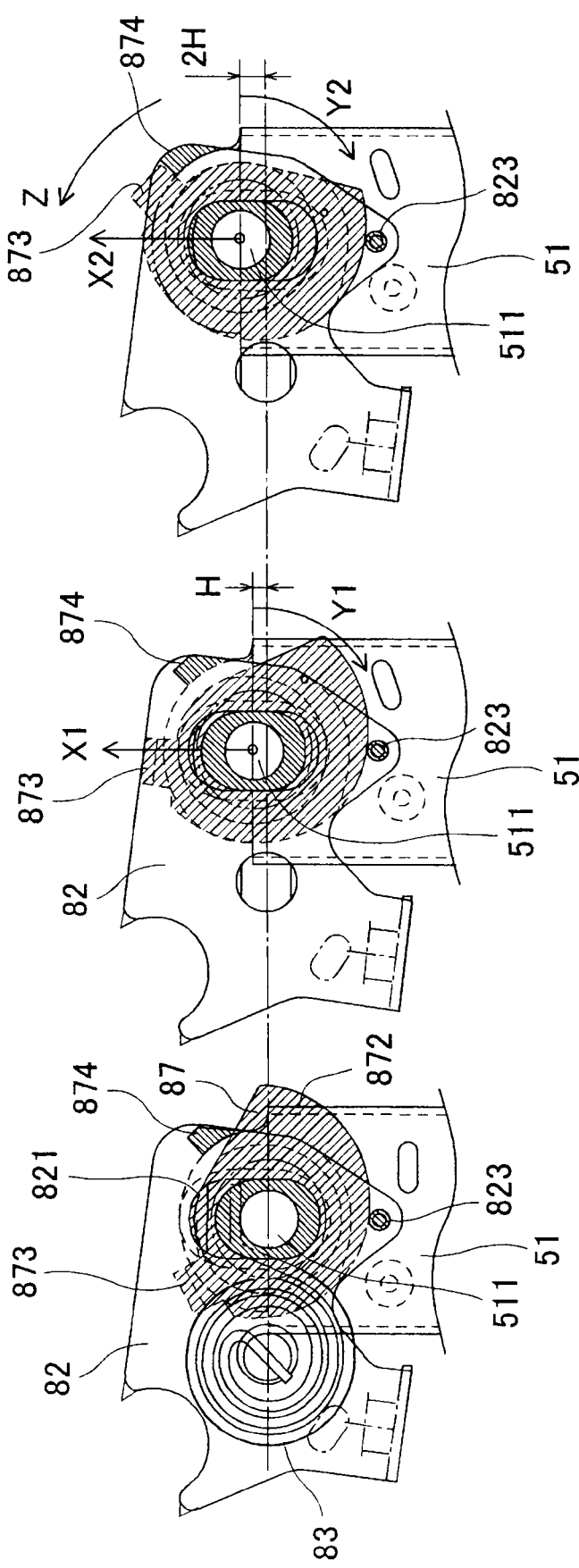
FIGS. 28A to 28C are diagrams each explaining operations of the cam member, an engagement pin, and a pressing piece according to the third embodiment.

Next, an operation of the seat apparatus according to the third embodiment will be explained with reference to FIGS. 28A, 28B, and 28C. FIGS. 28A to 28C are diagrams each explaining operations of the cam member 87, the engagement pin 823, and the pressing piece 874. In FIGS. 28A to 28C, those three components are shaded for easy viewing. The movement of the seat 2 by means of the four-link mechanisms 3, the engagement operations and the release operations of the lock devices 55 and 56 of the legs 51 and 52 are the same as those of the first embodiment and thus explanation thereof will be omitted. When the seat 2 moves to the seating position P1 and then the cushion frame 24 moves downward, the adjusted-side front lock device 55 engages with the corresponding front striker 41. At this time, in view of the other legs 51 and 52, the height relationship between the base bracket 82 and the adjusted front leg 51 is adjusted.

FIG. 28A illustrates a state before the engagement operation where the front leg 51 has not yet moved downward relative to the base bracket 82, i.e., to the cushion frame 24. FIG. 28B illustrates a state after the engagement operation and the front leg 51 moves upward by the height adjustment range H. FIG. 28C illustrates a state after the engagement operation and the front leg 51 moves upward by twice the height adjustment range H, i.e., the height 2H. When the front leg 51 moves upward relative to the cushion frame 24 as illustrated by arrows X1 and X2 in FIGS. 28B and 28C, the rotational shaft 511 of the front leg 51 is separated from the engagement pin 823 of the base bracket 82. Then, while the cam member 87, biased by the spring member 88, maintains the engagement between the cam surface 872 and the engagement pin 823, the cam member 87 rotates in the forward direction (i.e., the clockwise direction) by up to nearly 90 degrees as illustrated by arrows Y1 and Y2 in FIGS. 28B and 28C.

Because the engagement between the cam member 87 and the engagement pin 823 is maintained, the base bracket 82, specifically, the cushion frame 24 is prevented from moving upward, thereby restraining the vertical movement of the seat 2 at the seating position P1. Consequently, the stability of the seat 2 at the seating position P1 is enhanced.

In the stowed operation where the seat 2 moves from the seating position P1 to the stowed position P2, the front leg 51 rotates in the counterclockwise direction in FIGS. 28A to 28C. In association with the movement of the front leg 51, the pressing piece 874 presses the projection 873 in the rearward direction (i.e., the counterclockwise direction) as illustrated by an arrow Z in FIG. 28C. The cam member 87 rotates in the rearward direction against the biasing force of the spring member 88. Thus, the position of the cam member 87 automatically returns to a state as illustrated in FIG. 28A.

As mentioned above, according to the third embodiment, the cam member 87, the spring member 88, and the engagement pin 823 are provided in addition to the first embodiment. Thus, when the front leg 51 moves upward relative to the cushion frame 24 after the front leg 51 engages with the front striker 41, the engagement between the cam member 87 and the engagement pin 823 is maintained. Thus, the cushion frame 24 is prevented from moving upward relative to the front leg 51 after the engagement operation, thereby avoiding looseness caused by the cushion frame 24, specifically, the seat 2 moves upward.

A fourth embodiment including a hinge mechanism that serves as the seat moving mechanism will be explained with reference to FIG. 29. FIG. 29 is a side view illustrating a seat apparatus for a vehicle (hereinafter simply referred to as a seat apparatus) 11 according to the fourth embodiment equipped with the hinge mechanism. The seat apparatus 11 includes a seat for a vehicle (hereinafter simply referred to as a seat) 29, a hinge mechanism 391, a link mechanism 392, rear strikers 42, rear legs 58, rear lock devices 60, and a leg height adjusting mechanism 89. In FIG. 29, components provided only at a left side of the seat 29 are illustrated.

The seat 29 includes a seat cushion 291 and a seatback 292 provided at an upper rear portion of the seat cushion 291 so as to be tiltable thereto. A front side of a cushion frame that supports the seat cushion 291 is rotatably supported by the hinge mechanism 391. The link mechanism 392 can be bent at its center. One end of the link mechanism 392 is supported at the vehicle floor 91 while the other end is substantially supported at a center of the cushion frame in the longitudinal direction. When the link mechanism 392 is bent and the seat 26 rotates in the clockwise direction, the seat 29 moves to a seating position P11. When the link mechanism 392 extends and the seat 29 rotates in the counterclockwise direction, the seat 29 moves to a stowed position P22.

The rear strikers 42 each serve as the engagement member. The rear strikers 42 are provided at two portions on an upper surface of the vehicle floor 91 so as to face two rear corner portions, i.e., rear-left and rear-right corner portions, of the seat 29 in the seating position P11. The rear legs 58 and the rear lock devices 60 each serve as the locking member. The rear legs 58 are provided at rear-left and rear-right portions of the cushion frame so as to face the respective rear strikers 42. The rear lock devices 60 are provided at lower ends of the rear legs 58, respectively, which are engageable with the respective rear strikers 42. One of the rear legs 58 is directly provided at the cushion frame while the other one of the rear legs 58 is provided at the cushion frame via the leg height adjusting mechanism 89 so that the position of the other one of the rear legs 58 in the height direction is adjustable. The rear lock devices 60 and the leg height adjusting mechanism 89 are configured in substantially the same manner as the rear lock device 56 and the leg height adjusting mechanism 6 of the first embodiment.

According to the fourth embodiment, the rear legs 58 move substantially downward while the link mechanism 392 is bent and the seat 29 moves to the seating position P11. At this time, even when the height relation between the rear lock device 60 and the rear striker 42 provided at one side of the seat 29 in the width direction and the height relation between the rear lock device 60 and the rear striker 42 provided at the other side of the seat 29 are different from each other, one of the height relations is automatically adjusted by the leg height adjusting mechanism 89, thereby eliminating the height difference. Thus, the left and right rear lock devices 60 securely engage with the respective rear strikers 42. The seat 29 is stably locked at the seating position P11 by means of the hinge mechanism 391 and the two rear lock devices 60.

According to the fourth embodiment, the front side of the cushion frame is supported by the hinge mechanism 391. Alternatively, one of left and right sides, or a rear side of the cushion frame may be supported by the hinge mechanism 391.

As mentioned above, according to the first and third embodiments each including four legs 51 and 52, the height of one of the front legs 51 is adjusted. According to the second embodiment including the balancing mechanism 7 and the four legs 51 and 52, the relative height between the two front legs 51 is complementarily adjusted. According to the fourth embodiment, the height of one of the rear legs 58 is adjusted. The number of legs of which height is adjusted, a structure of the leg height adjusting mechanism, and the like are not limited to the above and are modifiable.

According to the aforementioned embodiments, the multiple front lock devices 55 and the rear lock devices 56 provided at the respective lower ends of the front legs 51 and the rear legs 52 move in the engaging movement locus direction to engage with the respective strikers 41 and 42 provided at the vehicle floor 91 in a case where the seat 2 moves to the seating position P1 by means of the four-link mechanisms 3. In addition, the rear lock devices 60 provided at the respective lower ends of the rear legs 58 move in the engaging movement locus direction to engage with the respective strikers 42 provided at the vehicle floor 91 in a case where the seat 29 moves to the seating position P11 by means of the hinge mechanism 391. At this time, even when a distance between one of the front lock devices 55 and the corresponding striker 41 and a distance between the other one of the front lock devices 55 and the corresponding striker 41 are different from each other, for example, the leg height adjusting mechanism 6 adjusts a position of one of the front lock devices 55 and the corresponding striker 41 in the engaging movement locus direction. In the same manner, at this time, even when a distance between one of the rear lock devices 58 and the corresponding striker 42 and a distance between the other one of the area lock devices 585 and the corresponding striker 42 are different from each other, for example, the leg height adjusting mechanism 89 adjusts a position of one of the rear lock devices 58 and the corresponding striker 42 in the engaging movement locus direction. As a result, the difference in the heights is eliminated to thereby achieve the secure engagement operations of all the lock devices 55 and 56. The seat 2, 29 is stably locked at the seating position P1, P11.

According to the aforementioned embodiments, the seat moving mechanism includes the two four-link mechanisms 3 provided at respective sides of the seat 2 in the width direction of the vehicle, each of the four-link mechanisms 3 including the two links 32 and 33 supported by the cushion frame 24 of the seat 2 and the vehicle floor 91. In addition, the plurality of locking members 51, 52, 55, 56 includes the four legs 51, 52 provided at the cushion frame 24 of the seat 2 and the lock devices 55, 56 provided at lower ends of the respective legs 51, 52 to engage with the respective strikers 41, 42. Further, the leg height adjusting mechanism 6 is obtained by one of the legs 51, 52 provided at the cushion frame 24 to be movable in the engaging movement locus direction and the lock device 55, 56, which is provided at the lower end of the one of the legs 51, 52, being biased downward by the spring member 63 by the spring force F2 greater than the engagement force F1 required for the lock device 55, 56 to engage with the striker 41, 42.

Accordingly, when the four-link mechanism 3 provided at both sides of the seat 2 in the vehicle width direction move the seat 2 to the seating position P2, the height of the front leg 51 that is movable in the engaging movement locus direction is automatically adjusted in accordance with the height of the fixed front leg 51. Thus, the engagement operations of all the lock devices 55 and 56 are securely performed, thereby achieving the stable locking of the seat 2 at the seating position P1.

According to the aforementioned fourth embodiment, the seat moving mechanism includes the hinge mechanism 391 that supports one side of the cushion frame of the seat 29 to cause the seat 29 to be movable between the seating position P11 and the stowed position P22. In addition, the plurality of locking members 58, 60 includes the two legs 58 provided at the other side of the cushion frame, one side and the other side of the cushion frame facing each other, and the lock devices 60 provided at lower ends of the respective legs 58 to engage with the respective engagement members 42. Further, the leg height adjusting mechanism 89 is obtained by one of the legs 58 provided at the cushion frame to be movable in the engaging movement locus direction and the lock device 60, which is provided at the lower end of the one of the legs 58, being biased downward by the spring member 63 by the spring force F2 greater than the engagement force F1 required for the lock device 60 to engage with the engagement member 42.

Accordingly, when the hinge mechanism 391 moves the seat 29 to the seating position P11, the height of the rear leg 58 that is movable in the engaging movement locus direction is automatically adjusted in accordance with the height of the fixed rear leg 58. Thus, the engagement operations of the two lock devices 60 are securely performed, thereby achieving the stable locking of the seat 29 at the seating position P11.

According to the aforementioned second embodiment, the plurality of locking members 51, 52, 55, 56 includes the plurality of legs 51, 52 provided at the cushion frame 24 of the seat 2 and the lock devices 55, 56 provided at lower ends of the respective legs 51, 52 to engage with the respective strikers 41, 42. In addition, the engagement position adjusting mechanism 6 is obtained by two of the plurality of legs 51 provided at the cushion frame 24 to be movable in the engaging movement locus direction and the two legs 51 making contact with respective end portions of the balancing link 75 rotatably supported by the cushion frame 24.

Accordingly, the heights of the two legs 51 that are movable in the engaging movement locus direction are automatically adjusted. Thus, the engagement operations of all the lock devices 55 and 56 are securely performed, thereby achieving the stable locking of the seat 2 at the seating position P1.

According to the aforementioned third embodiment, the seat apparatus 1 further includes the cam member 87 arranged to be movable relative to one of the legs 51 provided at the cushion frame 24 to be movable in the engaging movement locus direction, the engagement pin 823 provided at the cushion frame 24 to face the cam member 87, the spring member 88 biasing the cam member 87 in the forward direction where the cam member 87 keeps engaging with the engagement pin 823 in a case where the leg 51 moves upward relative to the cushion frame 24, and the pressing piece 874 moving the cam member 87 in the rearward direction against the spring force of the spring member 88 in association with the stowed operation performed by the four-link mechanism 3 for moving the seat 2 from the seating position P1 to the stowed position P2.

Accordingly, the cushion frame 24 is prevented from moving upward relative to the front leg 51 after the engagement operation thereof, thereby preventing looseness caused by the cushion frame 24, i.e., the seat 2, to move upward. In addition, the pressing piece 874 causes the cam member 87 to move in the rearward direction when the seat 2 moves to the stowed position P2. Thus, the engagement operation is available when the seat 2 moves to the seating position P1 next time.

According to the aforementioned third embodiment, the seat apparatus 1 further includes the leg rotation mechanism 512 (leg rotation spring) supporting the legs 51 to be rotatable to the cushion frame 24 and operating the legs 51 between the seating state where the legs 51 are arranged vertically with the cushion frame 24 and the stowed state where the legs 51 are arranged in parallel to the cushion frame 24 in association with the movement of the seat 2 between the seating position P1 and the stowed position P2. The cam member 87 is supported to be rotatable around the rotational shaft 511 of one of the legs 51. In addition, the cam member backward mechanism includes the pressing piece 874 formed at the one of the legs 51 in a projecting manner and causing the cam member 87 to rotate in the rearward direction against the spring force of the spring member 88 by means of the engagement with the projection 873 formed at the cam member 87 in a case where the legs 51 are operated from the seating state to the stowed state.

Accordingly, when the seat 2 is stowed, each of the legs 51 and 52 is operated from the seating state to the stowed state. In association with such operation, the cam member 87 automatically rotates in the rearward direction. Thus, the looseness caused by the seat 2 to move upward while the seat 2 is in the seating position P1 is prevented. In addition, the seat 2 is compactly stowed while each of the legs 51 and 52 is in the stowed state when the seat 2 is arranged in the stowed position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising;
   a seat for the vehicle;
   a seat moving mechanism moving the seat between a seating position and a stowed position;
   a plurality of engagement members provided at a vehicle floor;
   a plurality of locking members provided at the seat to face the plurality of engagement members respectively and engaging with the plurality of engagement members to lock the seat at the seating position; and
   an engagement position adjusting mechanism adjusting a position of at least one of the plurality of locking members in an engaging movement locus direction where the locking member moves to engage with the respective one of the plurality of engagement members,
   wherein the engagement position adjusting mechanism is biased downward via a first spring member having a spring force greater than an engagement force required for the locking member to engage with the engagement member.

2. The seat apparatus according to claim 1, wherein the seat moving mechanism includes two four-link mechanisms provided at respective sides of the seat in a width direction of the vehicle, each of the four-link mechanisms including two links supported by a cushion frame of the seat and the vehicle floor,
   wherein the plurality of locking members includes
      four legs provided at the cushion frame of the seat, and
      lock devices provided at lower ends of the respective legs to engage with the respective engagement members, and
   wherein the engagement position adjusting mechanism includes
      one of the legs provided at the cushion frame, the one of the legs being movable in the engaging movement locus direction, and
      the respective lock device, which is provided at the lower end of the one of the legs.

3. The seat apparatus according to claim 2, further comprising:
- a cam member arranged to be movable relative to the one of the legs provided at the cushion frame, the one of the legs being movable in the engaging movement locus direction;
- an engaging member provided at the cushion frame to face the cam member;
- a second spring member biasing the cam member in a forward direction where the cam member keeps engaging with the engaging member in a case where the one of the legs moves upward relative to the cushion frame; and
- a cam member backward mechanism moving the cam member in a rearward direction against a spring force of the second spring member in association with a stowed operation performed by the seat moving mechanism for moving the seat from the seating position to the stowed position.

4. The seat apparatus according to claim 3, further comprising:
- a leg rotation mechanism supporting the legs that are rotatable to the cushion frame and operating the legs between a seating state where the legs are arranged vertically with the cushion frame and a stowed state where the legs are arranged in parallel to the cushion frame, which corresponds with a movement of the seat between the seating position and the stowed position,
- wherein the cam member is rotatable around a rotational shaft of one of the legs, and
- wherein the cam member backward mechanism includes a pressing piece formed at the one of the legs in a projecting manner, the pressing piece causing the cam member to rotate in a rearward direction against the spring force of the second spring member by means of an engagement with a projection formed at the cam member in a case where the legs are operated from the seating state to the stowed state.

5. The seat apparatus according to claim 1, wherein the seat moving mechanism includes a hinge mechanism that supports a first side of a cushion frame of the seat to cause the seat to be movable between a seating position and a stowed position,
- wherein the plurality of locking members includes
  - two legs provided at a second side of the cushion frame, the first side and the second side of the cushion frame being opposite each other, and
  - lock devices provided at lower ends of the respective legs to engage with the respective engagement members, and
- wherein the engagement position adjusting mechanism includes
  - one of the legs provided at the cushion frame, the one of the legs being movable in the engaging movement locus direction, and
  - the respective lock device, which is provided at the lower end of the one of the legs.

6. The seat apparatus according to claim 5, further comprising:
- a cam member arranged to be movable relative to the one of the legs provided at the cushion frame, the one of the legs being movable in the engaging movement locus direction;
- an engaging member provided at the cushion frame to face the cam member;
- a second spring member biasing the cam member in a forward direction where the cam member keeps engaging with the engaging member in a case where the one of the legs moves upward relative to the cushion frame; and
- a cam member backward mechanism moving the cam member in a rearward direction against a spring force of the second spring member in association with a stowed operation performed by the seat moving mechanism for moving the seat from the seating position to the stowed position.

7. The seat apparatus according to claim 6, further comprising:
- a leg rotation mechanism supporting the legs that are rotatable to the cushion frame and operating the legs between a seating state where the legs are arranged vertically with the cushion frame and a stowed state where the legs are arranged in parallel to the cushion frame, which corresponds with a movement of the seat between the seating position and the stowed position,
- wherein the cam member is rotatable around a rotational shaft of one of the legs, and
- wherein the cam member backward mechanism includes a pressing piece formed at the one of the legs in a projecting manner, the pressing piece causing the cam member to rotate in a rearward direction against the spring force of the second spring member by means of an engagement with a projection formed at the cam member in a case where the legs are operated from the seating state to the stowed state.

8. The seat apparatus according to claim 1, wherein the plurality of locking members includes
- four legs provided at the cushion frame of the seat, and
- lock devices provided at lower ends of the respective legs to engage with the respective engagement members, and
- wherein the seat apparatus further comprises:
  - a cam member arranged to be movable relative to one of the legs provided at the cushion frame, the one of the legs being movable in the engaging movement locus direction;
  - an engaging member provided at the cushion frame to face the cam member;
  - a second spring member biasing the cam member in a forward direction where the cam member keeps engaging with the engaging member in a case where the one of the legs moves upward relative to the cushion frame; and
  - a cam member backward mechanism moving the cam member in a rearward direction against a spring force of the second spring member in association with a stowed operation performed by the seat moving mechanism for moving the seat from the seating position to the stowed position.

9. The seat apparatus according to claim 8, further comprising:
- a leg rotation mechanism supporting the legs that are rotatable to the cushion frame and operating the legs between a seating state where the legs are arranged vertically with the cushion frame and a stowed state where the legs are arranged in parallel to the cushion frame, which corresponds with a movement of the seat between the seating position and the stowed position,
- wherein the cam member is rotatable around a rotational shaft of one of the legs, and
- wherein the cam member backward mechanism includes a pressing piece formed at the one of the legs in a projecting manner, the pressing piece causing the cam member to rotate in a rearward direction against the spring force of the second spring member by means of an engagement with a projection formed at the cam member in a case where the legs are operated from the seating state to the stowed state.

10. A seat apparatus comprising:

a seat for the vehicle;

a seat moving mechanism moving the seat between a seating position and a stowed position;

a plurality of engagement members provided at a vehicle floor;

a plurality of locking members provided at the seat to face the plurality of engagement members respectively and engaging with the plurality of engagement members to lock the seat at the seating position; and an engagement position adjusting mechanism adjusting a position of at least one of the plurality of locking members in an engaging movement locus direction where the locking member moves to engage with the respective one of the plurality of engagement members, wherein the plurality of locking members includes
a plurality of legs provided at a cushion frame of the seat, and
lock devices provided at lower ends of the respective legs to engage with the respective engagement members, and wherein the engagement position adjusting mechanism includes two of the plurality of legs provided at the cushion frame, the two legs being movable in the engaging movement locus direction, and the two legs making contact with respective end portions of a balancing link rotatably supported by the cushion frame.

\* \* \* \* \*